(12) United States Patent
Pallikonda et al.

(10) Patent No.: US 11,693,923 B1
(45) Date of Patent: Jul. 4, 2023

(54) ROBOTIC PROCESS AUTOMATION SYSTEM WITH HYBRID WORKFLOWS

(71) Applicant: Automation Anywhere, Inc., San Jose, CA (US)

(72) Inventors: Murali Pallikonda, San Jose, CA (US); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 962 days.

(21) Appl. No.: 16/410,999

(22) Filed: May 13, 2019

Related U.S. Application Data

(60) Provisional application No. 62/670,820, filed on May 13, 2018.

(51) Int. Cl.
| | |
|---|---|
| *B25J 9/16* | (2006.01) |
| *G06K 9/62* | (2022.01) |
| *G06F 8/34* | (2018.01) |
| *G06N 20/00* | (2019.01) |
| *G06F 9/451* | (2018.01) |
| *G06Q 10/0631* | (2023.01) |
| *G06Q 10/10* | (2023.01) |

(52) U.S. Cl.
CPC ............. *G06K 9/6262* (2013.01); *G06F 8/34* (2013.01); *G06F 9/451* (2018.02); *G06N 20/00* (2019.01); *G06Q 10/06316* (2013.01); *G06Q 10/103* (2013.01)

(58) Field of Classification Search
CPC ......... G06N 20/00; G06F 9/451; G06F 17/18; G06Q 10/06316
See application file for complete search history.

(56) References Cited

U.S. PATENT DOCUMENTS

| | | |
|---|---|---|
| 5,949,999 A | 9/1999 | Song et al. |
| 5,983,001 A | 11/1999 | Boughner et al. |
| 6,133,917 A | 10/2000 | Feigner et al. |
| 6,389,592 B1 | 5/2002 | Ayres et al. |
| 6,427,234 B1 | 7/2002 | Chambers et al. |

(Continued)

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

(Continued)

*Primary Examiner* — Chirag R Patel

(57) ABSTRACT

A computerized task automation system operates to permit automation of processes comprising one or more computer implemented tasks. Software robots may be created and retrieved to automate human user interaction with computer systems. The software robots each take one of three forms: (i) an attended software robot that is encoded to interact with one or more application programs and to accept one or more inputs from the user as required by the one or more application programs, (ii) an unattended software robot that is encoded to automatically interact with one or more application programs without any user input; and (iii) a cognitive software robot that is encoded to automatically interact with one or more application programs without any user input and is further encoded to automatically alter its interactions with the one or more application programs by way of a machine learning engine.

20 Claims, 27 Drawing Sheets

(56) References Cited

U.S. PATENT DOCUMENTS

| | | | |
|---|---|---|---|
| 6,473,794 B1 | 10/2002 | Guheen et al. | |
| 6,496,979 B1 | 12/2002 | Chen et al. | |
| 6,640,244 B1 | 10/2003 | Bowman-Amuah | |
| 6,704,873 B1 | 3/2004 | Underwood | |
| 6,898,764 B2 | 5/2005 | Kemp | |
| 6,954,747 B1 | 10/2005 | Wang et al. | |
| 7,091,898 B2 | 8/2006 | Arling et al. | |
| 7,246,128 B2 | 7/2007 | Jordahl | |
| 7,398,469 B2 | 7/2008 | Kisamore et al. | |
| 7,441,007 B1 | 10/2008 | Kirkpatrick et al. | |
| 7,533,096 B2 | 5/2009 | Rice et al. | |
| 7,568,109 B2 | 7/2009 | Powell et al. | |
| 7,571,427 B2 | 8/2009 | Wang et al. | |
| 7,765,525 B1 | 7/2010 | Davidson et al. | |
| 7,805,317 B2 | 9/2010 | Khan et al. | |
| 7,805,710 B2 | 9/2010 | North | |
| 7,810,070 B2 | 10/2010 | Nasuti et al. | |
| 7,846,023 B2 | 12/2010 | Evans et al. | |
| 8,028,269 B2 | 9/2011 | Bhatia et al. | |
| 8,056,092 B2 | 11/2011 | Allen et al. | |
| 8,095,910 B2 | 1/2012 | Nathan et al. | |
| 8,132,156 B2 | 3/2012 | Malcolm | |
| 8,209,738 B2 | 6/2012 | Nicol et al. | |
| 8,234,622 B2 | 7/2012 | Meijer et al. | |
| 8,245,215 B2 | 8/2012 | Extra | |
| 8,352,464 B2 | 1/2013 | Fotev | |
| 8,396,890 B2 | 3/2013 | Lim | |
| 8,438,558 B1 | 5/2013 | Adams | |
| 8,443,291 B2 | 5/2013 | Ku et al. | |
| 8,464,240 B2 | 6/2013 | Fritsch et al. | |
| 8,498,473 B2 | 7/2013 | Chong et al. | |
| 8,504,803 B2 | 8/2013 | Shukla | |
| 8,631,458 B1 | 1/2014 | Banerjee | |
| 8,682,083 B2 | 3/2014 | Kumar et al. | |
| 8,713,003 B2 | 4/2014 | Fotev | |
| 8,769,482 B2 | 7/2014 | Batey et al. | |
| 8,819,241 B1 | 8/2014 | Washburn | |
| 8,832,048 B2 | 9/2014 | Lim | |
| 8,874,685 B1 | 10/2014 | Hollis et al. | |
| 8,943,493 B2 | 1/2015 | Schneider | |
| 8,965,905 B2 | 2/2015 | Ashmore et al. | |
| 9,104,294 B2 | 8/2015 | Forstall et al. | |
| 9,213,625 B1 | 12/2015 | Schrage | |
| 9,278,284 B2 | 3/2016 | Ruppert et al. | |
| 9,444,844 B2 | 9/2016 | Edery et al. | |
| 9,462,042 B2 | 10/2016 | Shukla et al. | |
| 9,571,332 B2 | 2/2017 | Subramaniam et al. | |
| 9,621,584 B1 | 4/2017 | Schmidt et al. | |
| 9,946,233 B2 | 4/2018 | Brun et al. | |
| 10,970,109 B1 * | 4/2021 | Berenstein | G06F 11/3409 |
| 2003/0033590 A1 | 2/2003 | Leherbauer | |
| 2003/0101245 A1 | 5/2003 | Srinivasan et al. | |
| 2003/0159089 A1 | 8/2003 | DiJoseph | |
| 2004/0083472 A1 | 4/2004 | Rao et al. | |
| 2004/0172526 A1 | 9/2004 | Tann et al. | |
| 2004/0210885 A1 | 10/2004 | Wang et al. | |
| 2004/0243994 A1 | 12/2004 | Nasu | |
| 2005/0188357 A1 | 8/2005 | Derks et al. | |
| 2005/0204343 A1 | 9/2005 | Kisamore et al. | |
| 2005/0257214 A1 | 11/2005 | Moshir et al. | |
| 2006/0095276 A1 | 5/2006 | Axelrod et al. | |
| 2006/0150188 A1 | 7/2006 | Roman et al. | |
| 2007/0101291 A1 | 5/2007 | Forstall et al. | |
| 2007/0112574 A1 | 5/2007 | Greene | |
| 2008/0005086 A1 | 1/2008 | Moore | |
| 2008/0028392 A1 | 1/2008 | Chen et al. | |
| 2008/0209392 A1 | 8/2008 | Able et al. | |
| 2008/0222454 A1 | 9/2008 | Kelso | |
| 2008/0263024 A1 | 10/2008 | Landschaft et al. | |
| 2009/0037509 A1 | 2/2009 | Parekh et al. | |
| 2009/0103769 A1 | 4/2009 | Milov et al. | |
| 2009/0172814 A1 | 7/2009 | Khosravi et al. | |
| 2009/0199160 A1 | 8/2009 | Vaitheeswaran et al. | |
| 2009/0217309 A1 | 8/2009 | Grechanik et al. | |
| 2009/0249297 A1 | 10/2009 | Doshi et al. | |
| 2009/0313229 A1 | 12/2009 | Fellenstein et al. | |
| 2009/0320002 A1 | 12/2009 | Peri-Glass et al. | |
| 2010/0023602 A1 | 1/2010 | Martone | |
| 2010/0023933 A1 | 1/2010 | Bryant et al. | |
| 2010/0100605 A1 | 4/2010 | Allen et al. | |
| 2010/0138015 A1 | 6/2010 | Colombo et al. | |
| 2010/0235433 A1 | 9/2010 | Ansari et al. | |
| 2011/0022578 A1 | 1/2011 | Fotev | |
| 2011/0145807 A1 | 6/2011 | Molinie et al. | |
| 2011/0197121 A1 | 8/2011 | Kletter | |
| 2011/0276568 A1 | 11/2011 | Fotev | |
| 2011/0276946 A1 | 11/2011 | Pletter | |
| 2011/0302570 A1 | 12/2011 | Kurimilla et al. | |
| 2012/0042281 A1 | 2/2012 | Green | |
| 2012/0124062 A1 | 5/2012 | Macbeth et al. | |
| 2012/0330940 A1 | 12/2012 | Caire et al. | |
| 2013/0173648 A1 | 7/2013 | Tan et al. | |
| 2013/0290318 A1 | 10/2013 | Shapira et al. | |
| 2014/0181705 A1 | 6/2014 | Hey et al. | |
| 2015/0082280 A1 | 3/2015 | Betak et al. | |
| 2015/0347284 A1 | 12/2015 | Hey et al. | |
| 2016/0019049 A1 | 1/2016 | Kakhandiki et al. | |
| 2016/0078368 A1 | 3/2016 | Kakhandiki et al. | |
| 2017/0001308 A1 * | 1/2017 | Bataller | G06F 3/0484 |
| 2017/0352041 A1 * | 12/2017 | Ramamurthy | G06N 5/043 |
| 2019/0155225 A1 * | 5/2019 | Kothandaraman | G06N 3/006 |

OTHER PUBLICATIONS

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.

Bergen et al., RPC automation: making legacy code relevant, May 2013, 6 pages.

Business Process Modeling Notation (BPMN), BPMI.org, v. 1.0, May 3, 2004.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2008).

Process Modeling Notations and Workflow Patterns, S. White, IBM Corp.

Tom Yeh, Tsung-Hsiang Chang, and Robert C. Miller, Sikuli: Using GUI Screenshots for Search and Automation, Oct. 4-7, 2009, 10 pages.

Yu et al., Deploying and managing Web services: issues, solutions, and directions, 36 pages (Year: 2008).

Zhifang et al., Test automation on mobile device, May 2010, 7 pages.

* cited by examiner

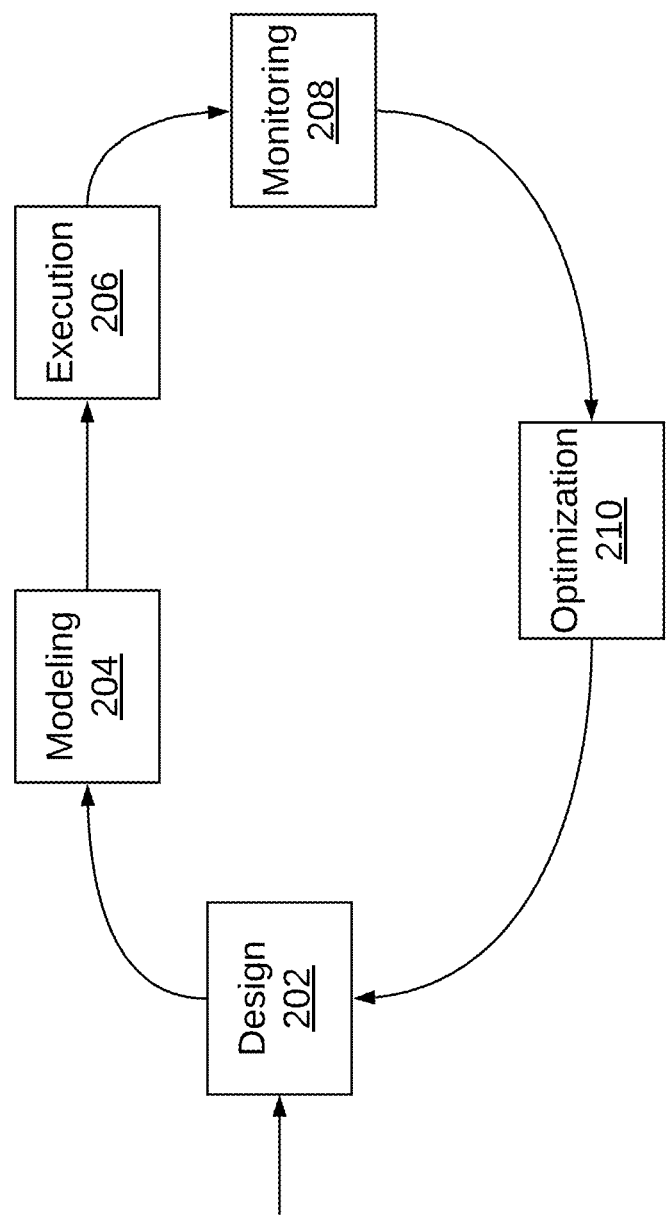

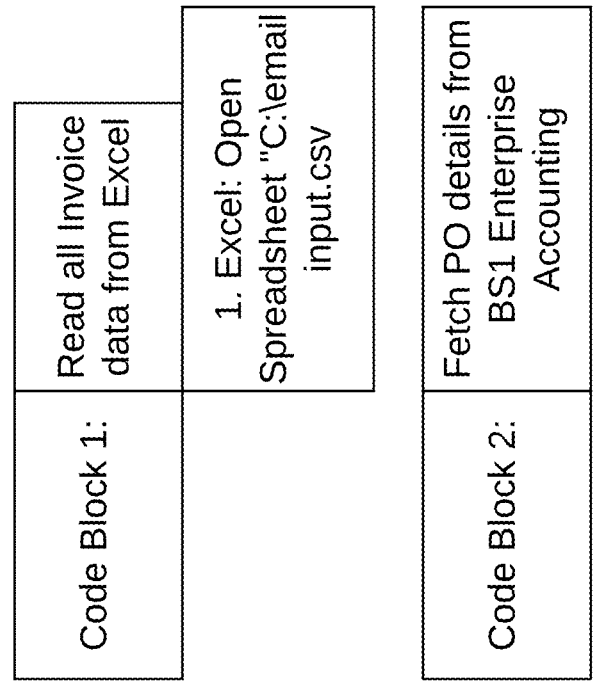

Code Block 1: Read all Invoice data from Excel
1. Excel: Open Spreadsheet "C:\email input.csv
2. Excel: Get value of cell "A2" and assign to variable "$InvoiceNumber$" Session: Invoice
3. Excel: Get value of cell "B2" and assign to variable "$PONumber$" Session: Invoice

Code Block 2: Fetch PO details from BS1 Enterprise Accounting

FIG. 5E

Code Block 1: Read all Invoice data from Excel
1. Excel: Open Spreadsheet "C:\email input.csv
2. Excel: Get value of cell "A2" and assign to variable "$InvoiceNumber$" Session: Invoice

Code Block 2: Fetch PO details from BS1 Enterprise Accounting

FIG. 5D

| Code Block 1: | Read all Invoice data from Excel |
|---|---|
| Code Block 2: | Fetch PO details from BS1 Enterprise Accounting |

FIG. 5G

| Code Block 1: | Read all Invoice data from Excel | 1. Excel: Open Spreadsheet "C:\email input.csv" | 2. Excel: Get value of cell "A2" and assign to variable "$InvoiceNumber$" Session: Invoice | 3. Excel: Get value of cell "B2" and assign to variable "$PONumber$" Session: Invoice | 4. Excel: Get value of cell "A3" and assign to variable "$InvoiceAmount$" Session: Invoice |
|---|---|---|---|---|---|
| Code Block 2: | Fetch PO details from BS1 Enterprise Accounting | | | | |

FIG. 5F

| Code Block 1: | Read all Invoice data from Excel |
|---|---|

| Code Block 2: | Fetch PO details from BS1 Enterprise Accounting | 5. Open: ""C:\Program Files (x86)\BS1 Enterprise Accounting - Free Edition\2015.4\BS1Ent.exe | 6. Run MetaBot "UltronAccounts.BS1 Enterprise Accounting - Free limited version" : Left click on pushbutton 'OK' (Screen) |
|---|---|---|---|

FIG. 5I

| Code Block 1: | Read all Invoice data from Excel |
|---|---|

| Code Block 2: | Fetch PO details from BS1 Enterprise Accounting | 5. Open: ""C:\Program Files (x86)\BS1 Enterprise Accounting - Free Edition\2015.4\BS1Ent.exe |
|---|---|---|

FIG. 5H

| Code Block 1: | Read all Invoice data from Excel |
|---|---|

| Code Block 2: | Fetch PO details from BS1 Enterprise Accounting |
|---|---|
| | 5. Open: ""C:\Program Files (x86)\BS1 Enterprise Accounting - Free Edition\2015.4\BS1Ent.exe |
| | 6. Run MetaBot "UltronAccounts.BS1 Enterprise Accounting - Free limited version" : Left click on pushbutton 'OK' (Screen) |

| Condition Block: PO details match with Invoice | 8. If $InvoiceAmount$ Equal To (=) $POAmount$ Then |
|---|---|

FIG. 5J ations claims priority to U.S. provisional patent
ROBOTIC PROCESS AUTOMATION SYSTEM WITH HYBRID WORKFLOWS

RELATED APPLICATIONS

This application claims priority to U.S. provisional patent application no. 62/670,820 filed on May 13, 2018, entitled Computerized Workflow Generation with Integrated Bot Selection and Generation, which provisional patent application is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

This disclosure relates generally to the field of data processing systems and more particularly to computerized task automation.

BACKGROUND

Organizations, such as businesses, governmental entities and private non-profit entities, are increasingly seeking to computerize their various regularly occurring processes. For example, a package delivery company may seek to employ computers to automate its shipping & handling operations, a health care organization such as a hospital may seek to automate its patient onboarding process, and a bank may seek to automate its mortgage processing process. Computerizing a process typically entails entering the necessary data into a computer application and processing and manipulating the data by way of one or more computer applications and electronically notifying downstream human users of computer-implemented tasks that require their attention. Computerization of business processes typically requires identifying the various tasks required to be performed in the process and identifying the inputs and outputs for each task and the sequence of the tasks. This analysis enables modification of the process as computerization sometimes permits a process to be implemented differently, and more efficiently, than when performed manually.

Typically, each of the tasks in a computerized process requires human interaction with a computer application. This can include data entry, analysis and communications with co-workers. Increasingly, organizations are seeking to automate certain tasks in which a human worker interacts with a computer application by way of Robotic Process Automation (RPA) technology which allows workers in an organization to configure a computer software robot, "robot" or "bot", to capture and interpret existing applications for processing a transaction, manipulating data, triggering responses and communicating with other digital systems. Conventional RPA systems employ software robots to interpret the user interface of third-party applications and to execute steps identically to a human user. Conventional business process planning systems typically lack the capability to easily and flexibly identify and employ RPA software robots to automate manually implemented computerized tasks.

SUMMARY

A computerized task automation system is disclosed herein which system includes a computerized data storage containing one or more data structures that each specify a process comprising a plurality of linked tasks. A first portion of the tasks are manually performed by one or more user interactions with one or more application programs on a computer system. A second portion of the tasks are automatically performed by one or more application programs executing on a computer system. The data storage also has stored therein, one or more software robots. Each software robot is encoded with a set of instructions that cause the software robot to interact with one or more applications, as encoded by the set of instructions, to perform one or more tasks with the one or more applications to complete a task in a manner that a user would perform the task. The computerized task automation system also includes a processor programmed with instructions that when executed by the processor, cause the processor to retrieve from the data storage, a process selected by a user. The processor provides to the user an interface that provides a visual representation of the process including tasks performed by the process and links among the tasks that specify a sequence in which the tasks are performed. The processor accepts from the user by way of the interface, one or more inputs to replace one or more of the first portion of the tasks with one or more of the software robots. Each of the software robot takes one of three forms: (i) an attended software robot that is encoded to interact with one or more application programs and to accept one or more inputs from the user as required by the one or more application programs, (ii) an unattended software robot that is encoded to automatically interact with one or more application programs without any user input; and (iii) a cognitive software robot that is encoded to automatically interact with one or more application programs without any user input and is further encoded to automatically alter its interactions with the one or more application programs by way of a machine learning engine.

The ability to easily incorporate the different types of software robots permits flexibility in automating manually implemented computerized tasks. In addition, the disclosed systems and methods permit software robots to be sequenced within execution of a computerized process. Moreover, in the disclosed systems and methods bots may communicate directly with each other and may be automatically conditionally deployed based on occurrence or non-occurrence of specified events.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 2 is a flow diagram illustrating high-level operations employed in a Business Process Management (BPM) system.

FIGS. 5B, 5C, 5D, 5E, 5F, 5G, 5H, 5I, 5J, 5K, 5L, and 5M illustrate creation of a new software robot employing a code view user interface generated by the computerized task automation system of FIG. 1.

FIGS. 5N and 5O are screenshots showing user interfaces for the design view and code view embodiments, respectively.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
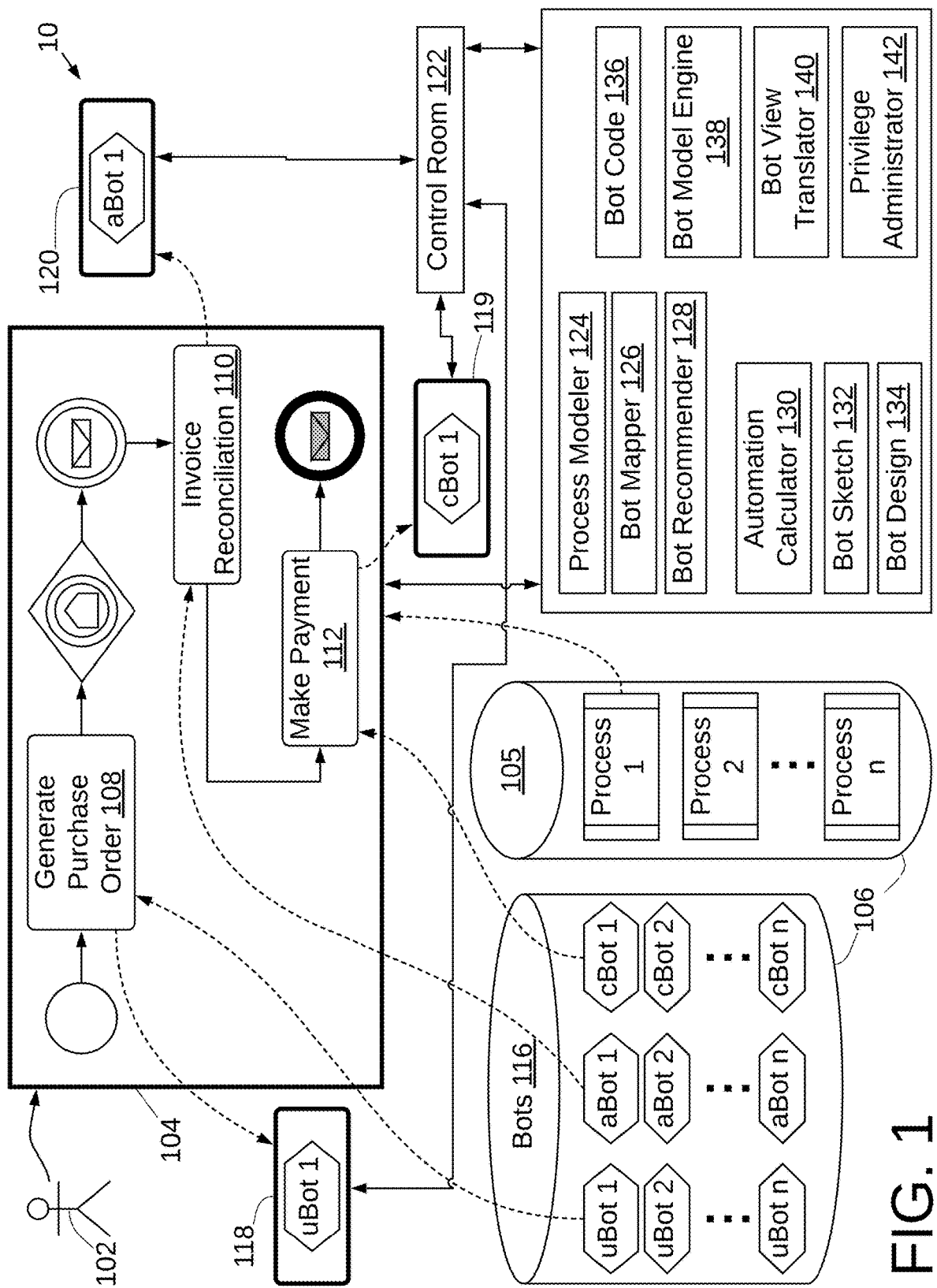
FIG. 1 is a high-level block diagram of an embodiment of a computerized task automation system employing the principles described herein.

FIG. 1 is a high-level block diagram of an embodiment of a computerized task automation system 10 employing the principles described herein. A user 102 interacts with a User Interface (UI) 104 generated by the system 10 to create, import and modify computerized business processes and to automate certain tasks performed by the computerized business processes. The user 102 has employed the interface 104 to retrieve a previously defined process 105 from storage 106 which has stored therein a plurality of defined processes 105. The process 105 retrieved by the user 102 is a procurement to payment process that defines the various computer-implemented tasks that must be performed to procure goods/services from generating a purchase order (108) to reconciling an invoice (110) to making a payment (112). The business process may be modeled in a variety of ways, including by way of Business Process Model and Notation (BPMN) syntax which is a standard for business process modeling that provides a graphical notation for specifying business processes in a Business Process Diagram (BPD). BPMN permits support of business process management for technical users and business users, by providing a notation that is intuitive to business users, yet able to represent complex process semantics. The BPMN specification also provides a mapping between the graphics of the notation and the underlying constructs of execution languages, particularly Business Process Execution Language (BPEL). Aspects of BPMN are described in Stephen A. White (3 May 2004), "Business Process Modeling Notation v1.0", Business Process Management Initiative, bpmi.org.

The user 102 may advantageously employ the interface 104 to implement certain tasks of the business process being displayed by the interface 104 by way of software robots 116, stored in storage 106. Each software robot comprises a set of task processing instructions operable to interact at a user level with one or more designated user level application programs. As used herein, the term "bot" is generally synonymous with the term software robot. In certain contexts, as will be apparent to those skilled in the art in view of the present disclosure, the term "bot runner" refers to a device (virtual or physical), such as devices 118, 119, 120, having the necessary software capability on which a bot will execute or is executing.

The bots 116 execute on a player, via a computing device, to perform the functions encoded by the bot. Additional aspects of operation of bots may be found in the following pending patent application, which refers to bots as automation profiles, System and Method for Compliance Based Automation, filed in the U.S. Patent Office on Jan. 6, 2016, and assigned application Ser. No. 14/988,877, which is hereby incorporated by reference in its entirety.

Some or all of the bots 116 may in certain embodiments be located remotely from control room 122. Moreover, the devices 118-120 may also be located remotely from control room 122. The bots 104 and the tasks 106 are shown stored in separate storage containers for purposes of illustration but they may be stored in separate or the same device(s), or across multiple devices. The control room 122 performs user management functions, source control of the bots 116, along with providing a dashboard that provides analytics and results of the bots 116, performs license management of software required by the bots 116 and manages overall execution and management of scripts, clients, roles, credentials, and security etc. The major functions performed by the control room 122 include: (i) a dashboard that provides a summary of registered/active users, tasks status, repository details, number of clients connected, number of scripts passed or failed recently, tasks that are scheduled to be executed and those that are in progress; (ii) user/role management-permits creation of different roles, such as hot creator, bot runner, admin, and custom roles, and activation, deactivation and modification of roles; (iii) repository management—to manage all scripts, tasks, workflows and reports etc.; (iv) operations management-permits checking status of tasks in progress and history of all tasks, and permits the administrator to stop/start execution of hots currently executing; (v) audit trail-logs creation of all actions performed in the control room; (vi) task scheduler-permits scheduling tasks which need to be executed on different clients at any particular time; (vii) credential management-permits password management; and (viii) security; management-permits rights management for all user roles. The control room 122 is shown generally for simplicity of explanation. Multiple instances of the control room 122 may be employed where large numbers of hots are deployed to provide for scalability of the system 10. Additional details of certain aspects of control room 122 may be found in U.S. patent application Ser. No. 16/146,485, filed on Sep. 28, 2018, entitled ROBOTIC PROCESS AUTOMATION SYSTEM WITH QUEUE ORCHESTRATION AND TASK PRIORITIZATION, which application is assigned to the assignee of the present application and which application is hereby incorporated by reference in its entirety.

The process modeler 124 allows a user to create, modify, import and export a business process. Business processes are modelled as a series of steps with logic flow between them. The process modeler 124 also enables creation of workflows by connecting existing bots with various types of logic. Data can be passed between bots. The Bot Mapper 126 allows a user to create bot(s) or assign existing bot(s) for any step in a business process. Once a bot is associated with a business process step, this information is available to all bots/services on the RPA platform. The Bot Recommender 128 recommends other similar/complementary bots developed by the user 102's organization or by other organizations and available in a shared repository (such as the Bot Store offered by Automation Anywhere, Inc.) based on the existing bots already mapped to business process steps. This enables bot discovery for maximum re-use of bots and existing automation ROI. The Automation Calculator 130 computes the amount of automation already done and the amount remaining (backlog). It does this by comparing the number of automated steps to the total number of steps in the process. The Automation Calculator 130 also computes the ROI based on the automation already done for a business process by aggregating the calculated human labor and time for all automated business process steps. The Bot Sketch module 132 consists of visual screenshots of all key actions taken by the user, which will be executed by the bot. A non-technical user can create a Bot Sketch by simply turning on a recorder and carrying out the actions that the bot needs to execute in the correct order of sequence. The Bot Sketch module 132 will show all/key connected visuals for the bot. Bot sketch is only visible to those users who have access to that view for that specific bot. The Bot Sketch is the first step in defining the bot that needs to be created. The Bot Design 134 is a visual bot modeling interface that allows a user to create a bot by defining building blocks, using various recorders found in the RPA platform, steps to manipulate data and dragging & dropping various automation commands. The bot is represented in a visual, workflow style interface geared towards non-technical users. The Bot Code 136 is an integrated development environment (IDE) where a developer can directly write code for a bot. The Bot Model Engine 138 stores the bot design, the underlying command structure and all the metadata associated with the bot. It enables the Bot View Translator 140 to translate the Bot Design to Bot Code. The Bot View Translator 140 enables users to switch between the Bot Design and Bot Code views. It contains the viewing logic to enable these conversions at a automation command/granular level. The Privilege Administrator 142 stores and enforces view level privileges so users can view either bot design, bot code or both views.

The bots 116 may take one of a variety of forms. Unattended bots, seen as uBot 1, uBot 2, . . . , uBot n, are encoded to operate automatically without human user involvement. These bots may be deployed by a human user or may be deployed, without human involvement, programmatically by another bot or other software. uBots are particularly useful in batch processing environments where a large amount of documents, for example, need to be processed, an such bots may be scheduled to run at particular times or upon occurrence of particular events. Attended bots, seen as aBot 1, aBot 2, . . . , aBot n, are encoded to automatically perform certain tasks but with human user involvement, which may include for example, entry of certain data and making of subjective judgments when presented with certain data. An aBot performs certain tasks automatically and accepts user input, such as for example in a call center, as needed. Cognitive bots, seen as cBot 1, cBot 2, . . . , cBot n, are encoded to automatically interact with one or more application programs without any user input and are further encoded to automatically alter their interactions with the one or more application programs by way of a machine learning engine. The cognitive bots permit automation of tasks involving unstructured data to permit use of technologies such as computer vision, natural language processing, fuzzy logic, and machine learning without the help of data scientists or highly trained experts. When employed with computer vision, a cBot can identify and categorize unstructured content allowing the cBot to intelligently extract decision-making data. For natural language processing a cBot can comprehend the meaning and intent of content to improve decision making. By employing fuzzy logic, a cBot can conduct phonetic algorithm and fuzzy string matching against enterprise applications to validate and enrich extracted data. By employing machine learning a cBot can learn by observing human behavior and developing domain expertise increasing accuracy and reducing exceptions. Additional details of certain aspects of cBots maybe found in U.S. patent application Ser. No. 16/023,786, filed on Jun. 29, 2018, entitled ROBOTIC PROCESS AUTOMATION SYSTEM AND METHOD WITH CROSS-DOMAIN LEARNING, which application is assigned to the assignee of the present application and which application is hereby incorporated by reference in its entirety.

The user 102 may employ the system 10 by way of the interface 104 to define a process 105 and to specify which tasks should be performed by a bot, which may be a uBot, a aBot and/or a cBot. As seen, by the dotted line from uBot 1 to process task 108, the user 102 has designated an unattended bot, uBot 1, to perform process task 108, generate purchase order. Task 110, invoice reconciliation, has been assigned by the user 102 aBot 1 and task 112, make payment, has been assigned cBot 1.

Preferably, the bots 116 that are available to the user 102 have associated metadata to characterize the bot's capabilities and functions to permit searching and identification of appropriate bot(s). As further described herein, the bots 116 may in certain embodiments be assigned by the user 102 to a particular task, once identified, by conventional drag and drop actions. Each bot 116 that is assigned for processing of a process 105 executes on a device, that may be a physical device, or a virtual device (such as implemented by a virtual machine), when invoked within the process 105, via control room 122. As seen, uBot 1 executes on device 118, cBot 1 executes on device 119 and aBot 1 executes on device 120.

Operation of the creation and editing of a process 105 may be better understood in connection with FIG. 2 which is a flow diagram illustrating high-level operations employed in a Business Process Management (BPM) system. FIG. 2 is a high-level diagram showing the overall operations typically performed in a BPM system and is provided to facilitate understanding of the embodiments disclosed herein. As seen in FIG. 2, a BPM system involves a design operation 202 which helps to ensure a correct overall design of a process 105. This operation includes identification of existing processes and design of new processes. Modeling operation 204 involves employing the results of the design operation and running various tests, such as by employing different combinations of variables to help determine how the process might operate under different circumstances. Execution operation 206 involves running the tasks identified and defined for the process, such as shown in FIG. 1. This may be done manually or automatically or with a combination of manual and automated business tasks. Monitoring operation 208 encompasses the tracking of individual processes, so that information on their state can be easily seen, and statistics on the performance of one or more processes can be provided. An example of this tracking is being able to determine for example, the state of a customer order (e.g. order arrived, awaiting delivery, invoice paid) so that problems in its operation can be identified and corrected. For tasks implemented with bots 116, each bot, when executing, provides control room 122 with detailed data on its execution to facilitate the monitoring operation. Optimization operation 210 includes retrieving process performance information from the modeling or monitoring operations and identifying potential or actual bottlenecks and opportunities (such for cost savings) or other improvements and modifying the defined process. This can be advantageously facilitated with the detailed data provided by the bots 116. Additional aspects of logging of data generated by the bots may be found in the following pending patent application ZERO FOOTPRINT ROBOTIC PROCESS AUTOMATION SYSTEM, filed in the U.S. Patent Office on Apr. 30, 2019, and assigned application Ser. No. 16/398,532, which is assigned to the assignee of the present application and which application is hereby incorporated by reference in its entirety.

Figure 3A:
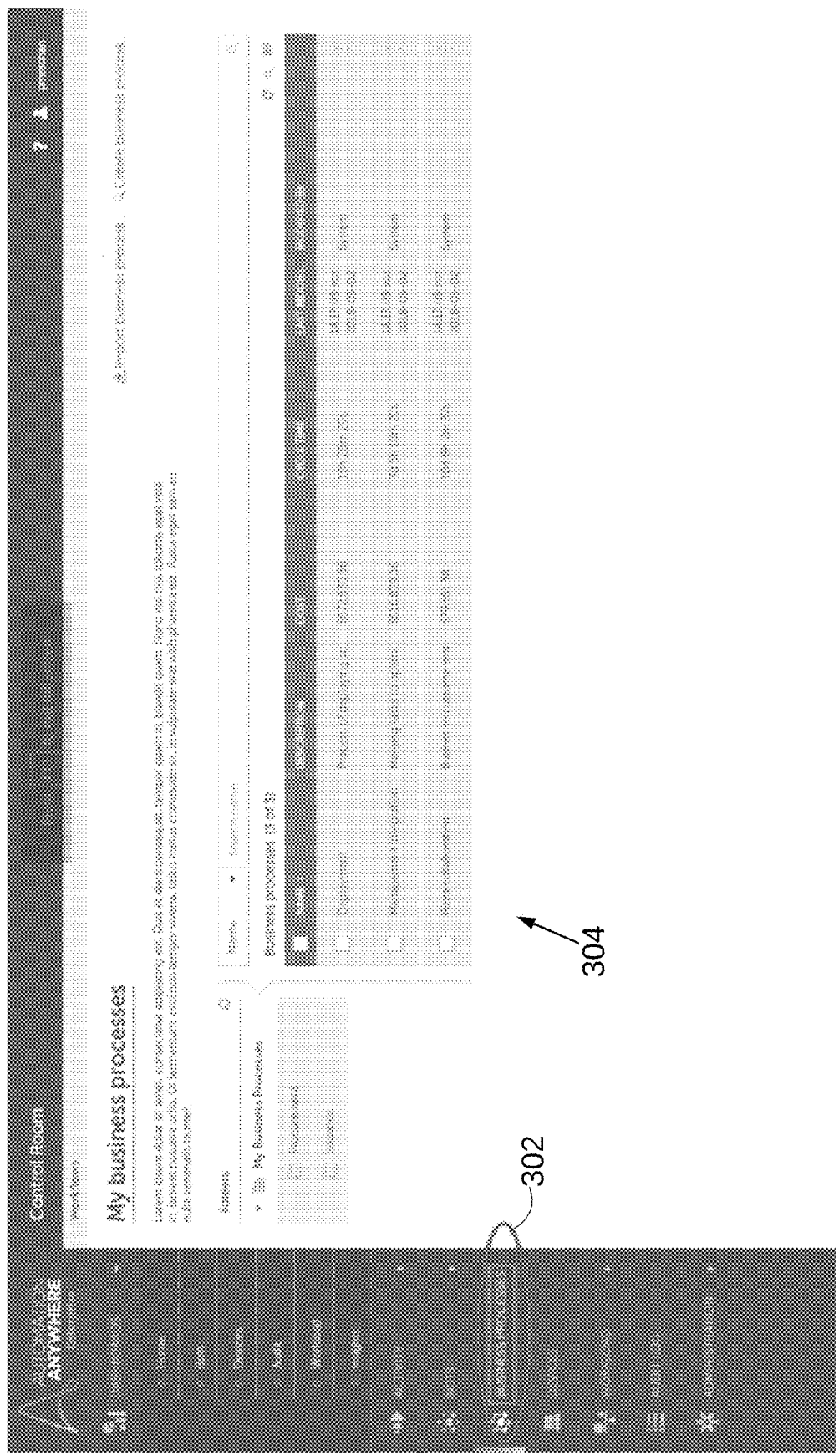
FIGS. 3A, 3B, 3C, 3D and 3E are screen shots showing aspects of a user interface generated by the computerized task automation system of FIG. 1 to permit importing of a defined business process.
Figure 3B:
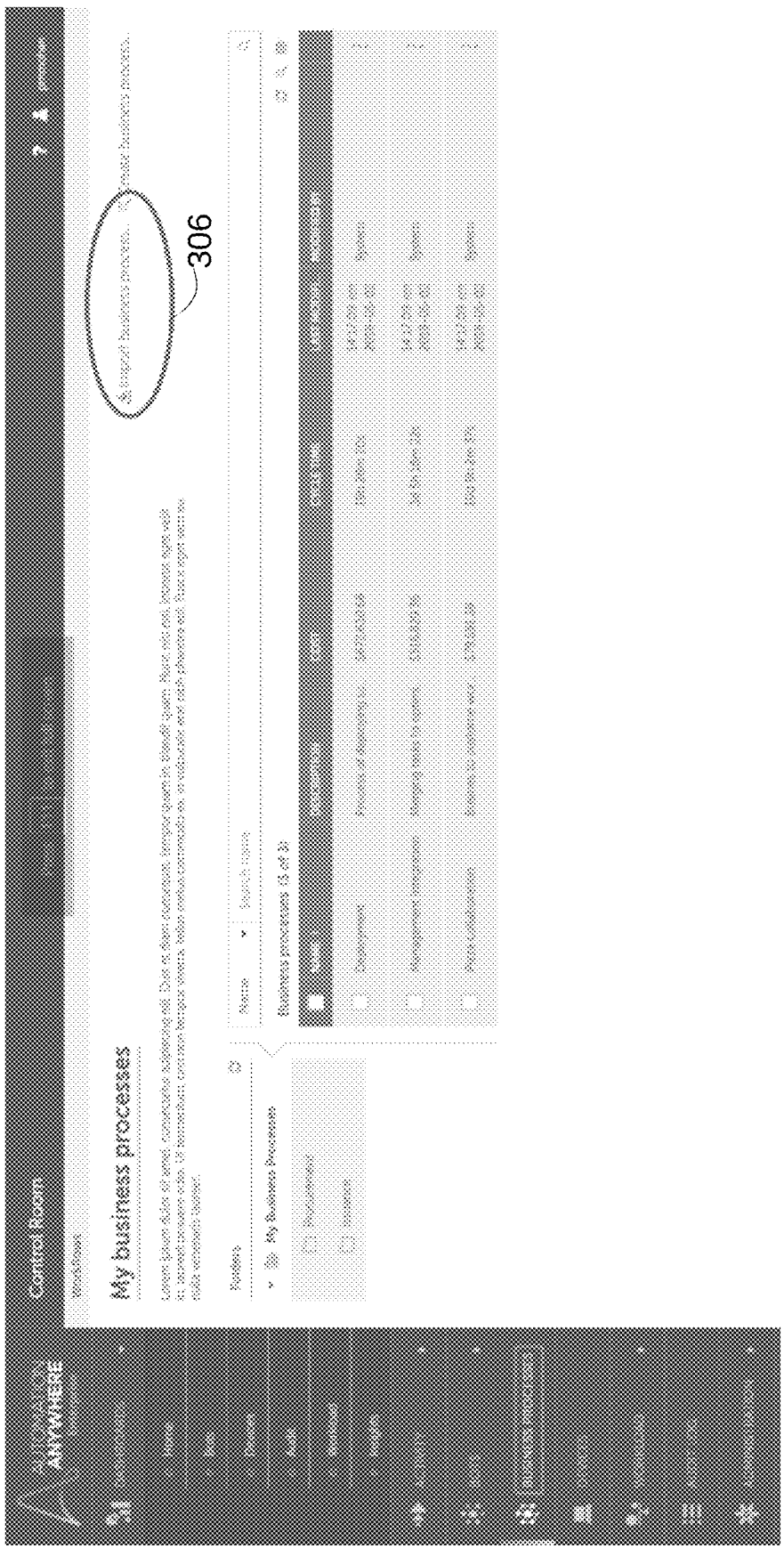
Figure 3C:
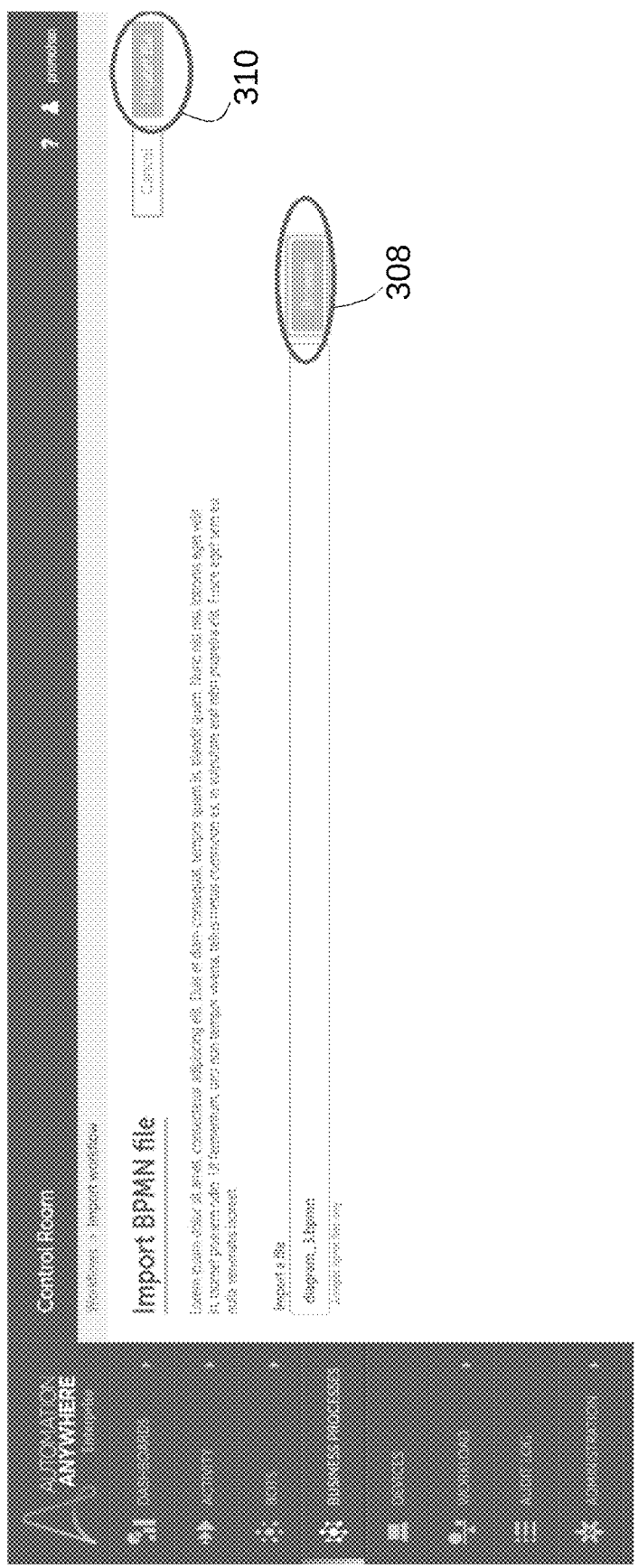
Figure 3D:
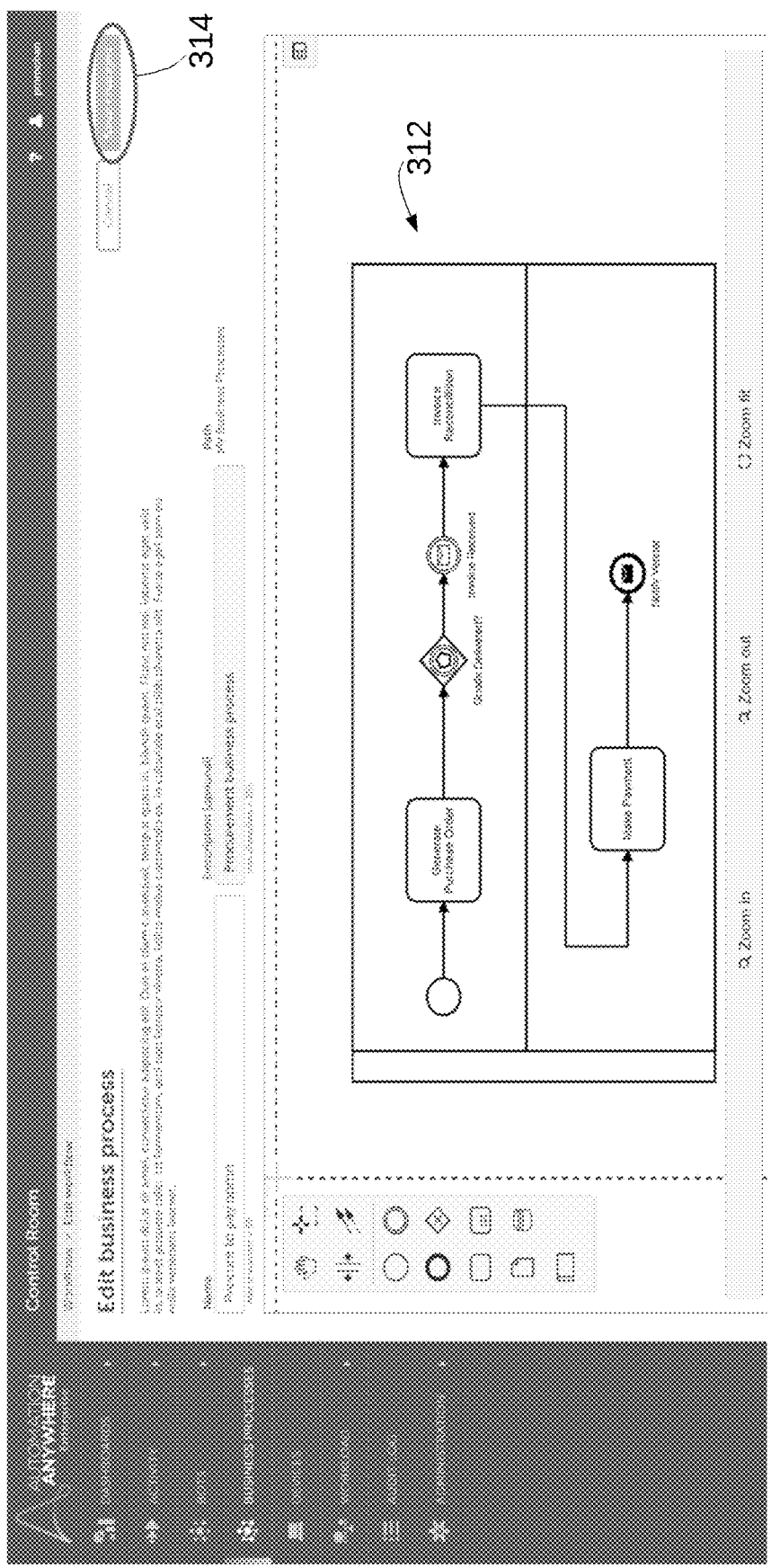
Figure 3E:
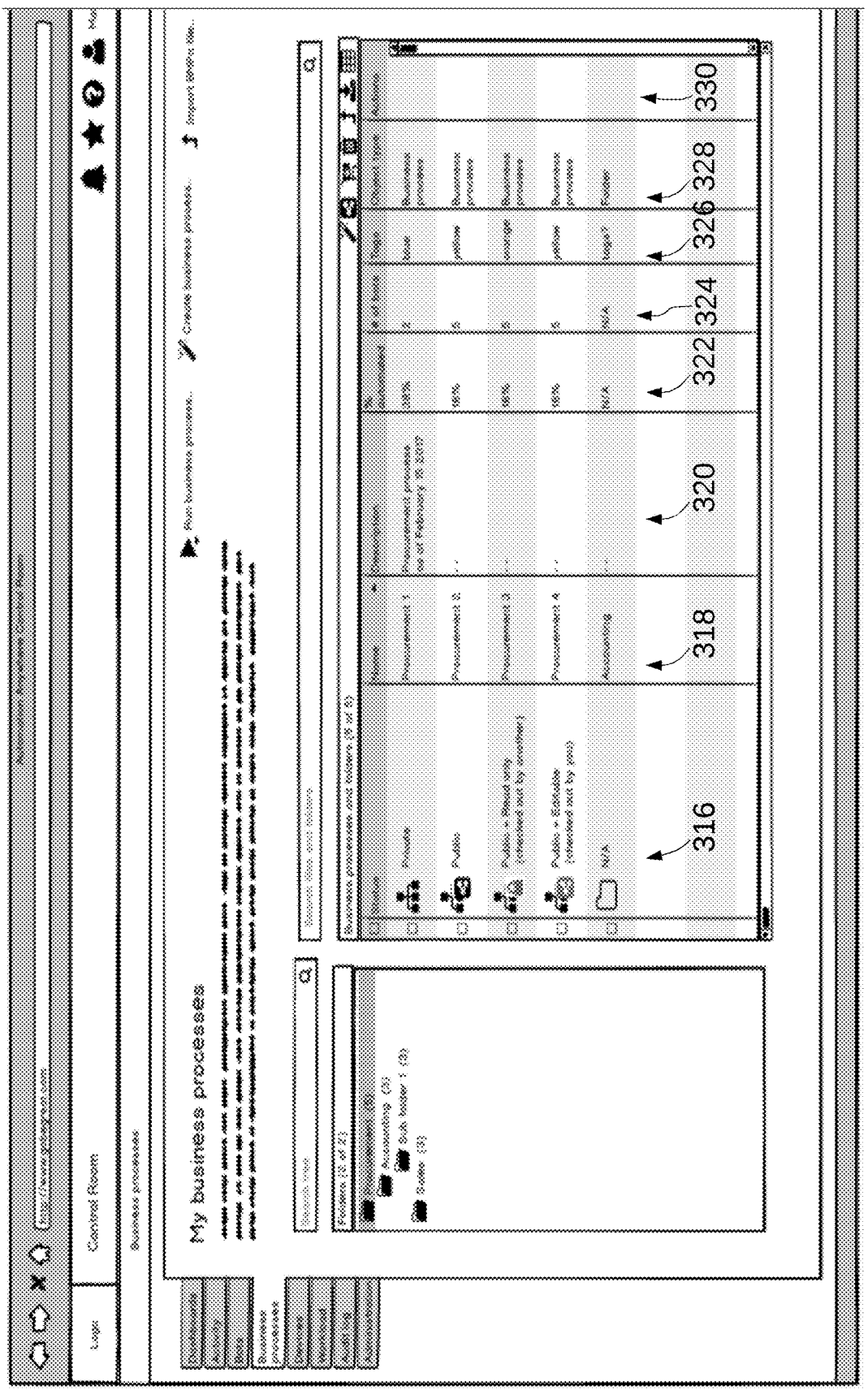

FIGS. 3A, 3B, 3C, 3D and 3E are screen shots showing aspects of a user interface generated by the computerized task automation system of FIG. 1 to permit importing of a defined business process. In FIG. 3A, a user 102 logs into the control room 122 and selects "Business Processes" tab 302 on the left. The system 10 responds by displaying a business processes landing page 304 showing three business processes associated with the user 102: Deployment, Management integration, Pizza collaboration. In FIG. 3B, the user 102 imports a business process, which may be encoded as a BPMN file, by clicking on "Import business process" link 306. The system responds by providing the screen in FIG. 3C which permits entry of a filename or selection of a file by way of browse button. The user 102 selects a file (diagram_3.bpmn) and clicks on "Import file" button 310 at the top of the screen. The system 10 responds by importing the specified business process file and displaying as shown in FIG. 3D the visual representation 312 encoded in the file in an editing mode that accepts user inputs via a visual interface to modify the specified process and to save the modified process file via save button 314. The system 10 responds by providing a landing page seen in FIG. 3E which displays the processes 105 associated with the user 102 and various characteristics of each process. For example, the status of each process is shown at 316 (e.g. private or public, public, and read only or editable). The name of the process is shown at 318, a description at 320, percent of automation at 322, # of bots employed at 324, assigned tags 326, object type 328 and actions 330. The user 102 may select a particular process 105 and edit the characteristics and other aspects of the process.

Figure 4A:
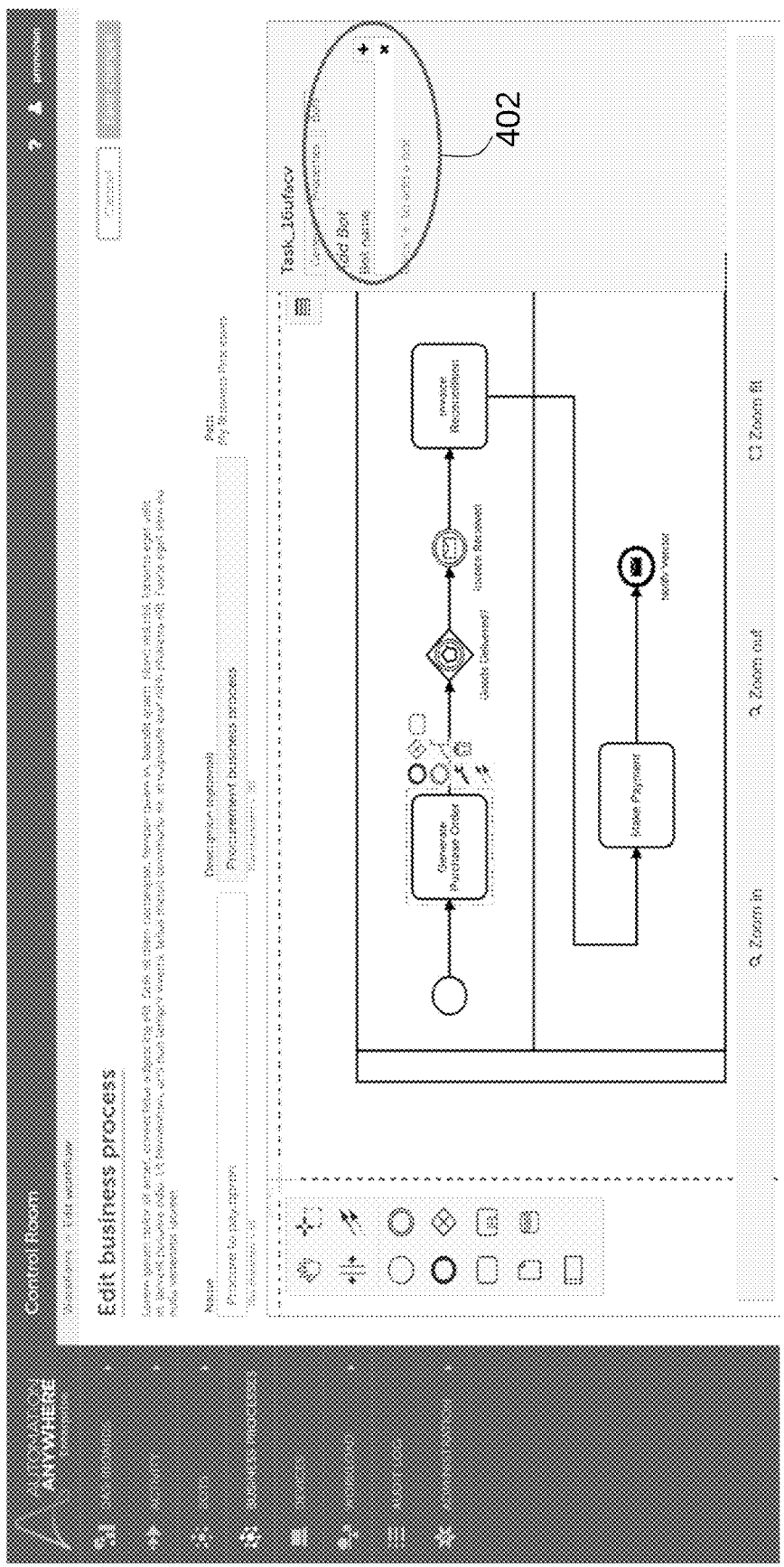
FIGS. 4A and 4B are screen shots showing aspects of a user interface generated by the computerized task automation system of FIG. 1 to select existing software robots and to create new software robots.
Figure 4B:
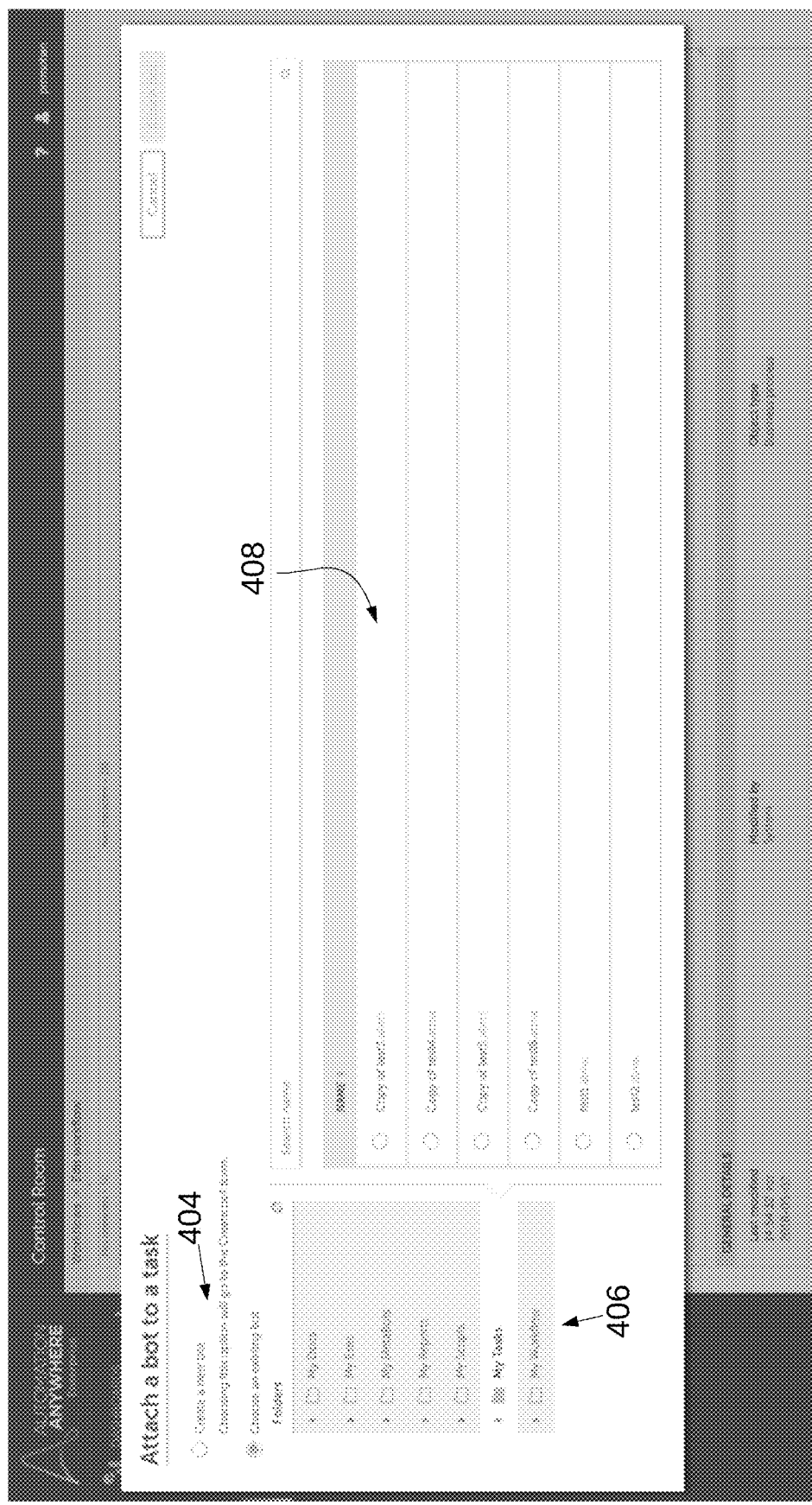

FIGS. 4A and 4B are screen shots showing aspects of a user interface generated by the computerized task automation system of FIG. 1 to select existing software robots and to create new software robots. As seen in FIG. 4A, the user 102 has selected and retrieved the procure to pay process 105 shown in FIG. 1, for editing. The system 10 responds as shown in FIG. 1 by displaying the selected process in the edit mode. The user 102 chooses to add bots 116 by specifying bots to be added at field 402. The system 10 responds as shown in FIG. 4B by permitting the user 102 to attach a bot to a task. The user 102 may create a new bot by selecting selector 404, in which event the system 10 will provide to the user 102 a create bot screen to permit creation of a new bot. In FIG. 4B, the user 102 has opted to choose an existing bot. In the embodiment of FIG. 4B, the bots are shown being organized in a folder structure 406. The user 102 has selected a folder "My Tasks" and the bots contained in the selected folder are seen at 408. One or more of the displayed bots may be selected for attachment. In the event that the user 102 selects bot creation selector 404, the user may create a new bot by one or more conventional techniques, such as recording of actions or by manually entering specified instructions or commands into a bot file.

Figure 5A:
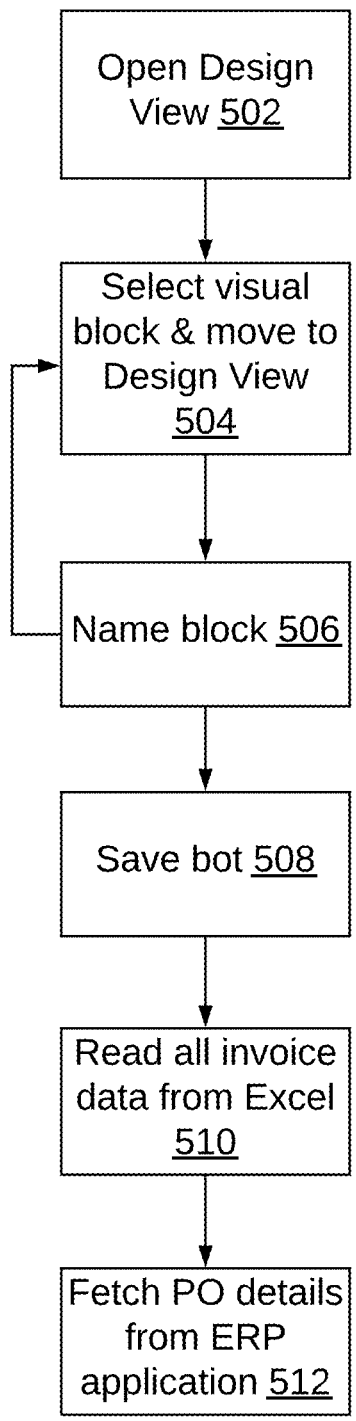
FIG. 5A is a flow diagram illustrating creation of a new software robot employing a design view user interface generated by the computerized task automation system of FIG. 1.

FIG. 5A is a flow diagram illustrating creation of a new software robot employing a design view user interface generated by the computerized task automation system of FIG. 1. Certain embodiments provide a graphical user interface to simplify generation of a software robot by way of a design view interface that operates in a manner shown in FIG. 5A. In FIG. 5A, the user 102 opens the design view interface at 502. The user 102 then selects at 504 a visual block from the user interface of the design view interface and at 504 names the block, such as for example "Read all Invoice data from Excel". The user may then repeat steps 504 to select and name additional blocks to specify additional functions to be performed by the bot, such as for example "Fetch PO details from ERP application", after which, the bot is saved at 508. The bot as encoded then at 510 and 512 performs the actions specified by the user 102 at 504 and 506 for the bot. The examples set forth above for the bot are simplified for purposes of explanation. In practice, the spreadsheet file corresponding to the Microsoft Excel application would be specified along with fields within the specified spreadsheet file and the ERP application would be specified along with login credentials along with specific steps to use the ERP application to display the required PO details or to programmatically extract the required PO details from the ERP application.

FIGS. 5B, 5C, 5D, 5E, 5F, 5G, 5H, 5I, 5J, 5K, 5L, and 5M illustrate creation of a new software robot employing a code view user interface generated by the computerized task automation system of FIG. 1. Certain embodiments provide in addition to, or in lieu of, the graphical user interface of FIG. 5A, a code view user interface to create a new software robot. Turning to FIG. 5B, the user selects the code view interface and the system 10 responds by showing the code view which includes two main blocks, Code Block 1 and Code Block 2. Code Block 1 has the command "Read all Invoice data from Excel" and Code Block 2 has the command "Fetch PO details from ERP Application". The user 102 clicks on an expand button to view what's inside Code Block 1 and drags an Open Excel command to the code view and adds the details of the Excel file as shown in FIG. 5C.

Turning to FIG. 5D, the user 102 drags an "Excel Get Value of Cell" command and assigns A2 to variable "InvoiceNumber". In FIG. 5E, the user 102 drags an "Excel Get Value of Cell" command and assigns B2 to variable "PONumber". In FIG. 5F, the user 102 proceeds to drag an "Excel Get Value of Cell" command and assigns C2 to variable "InvoiceAmount".

Figure 5K:
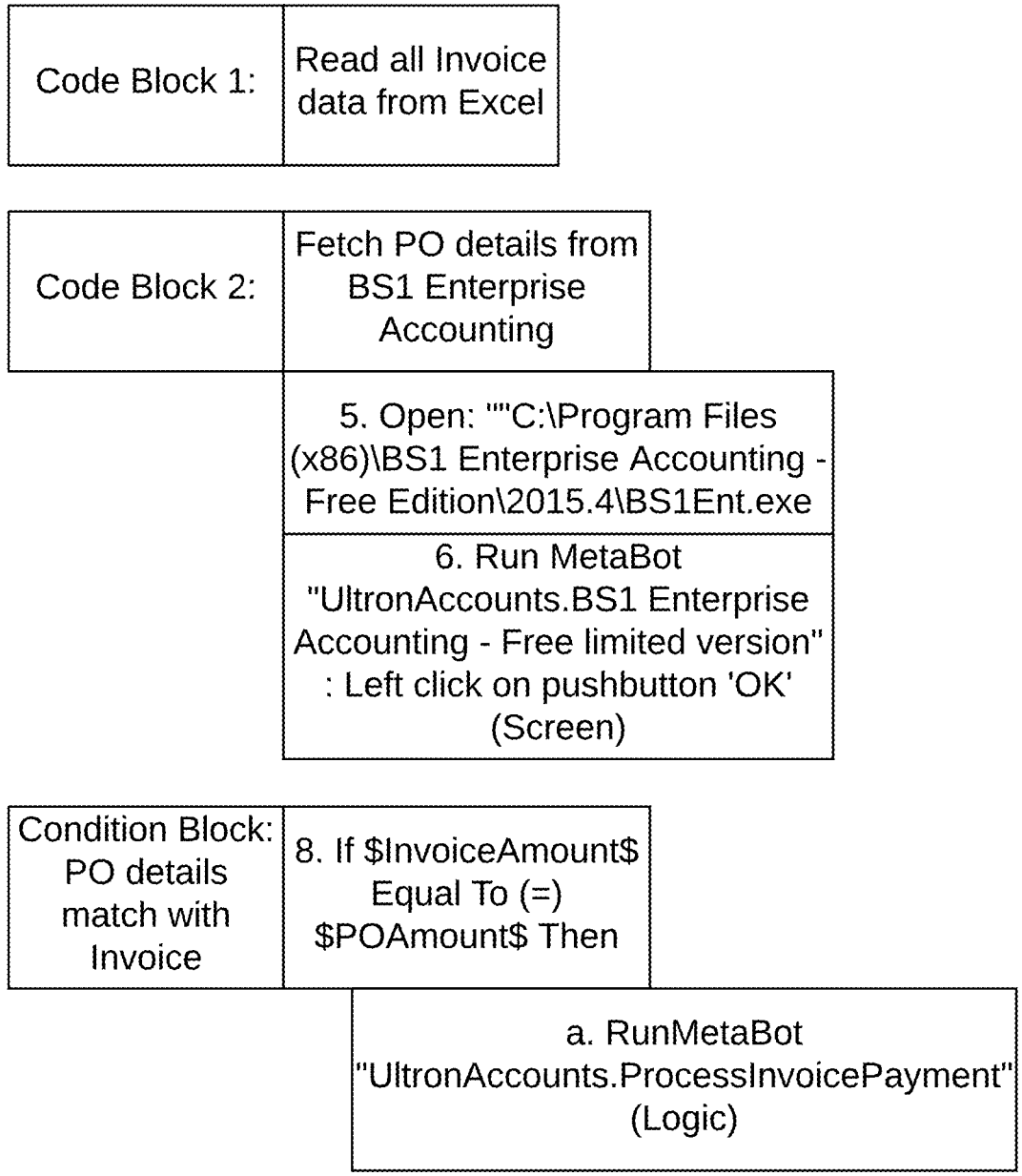
Figure 5L:
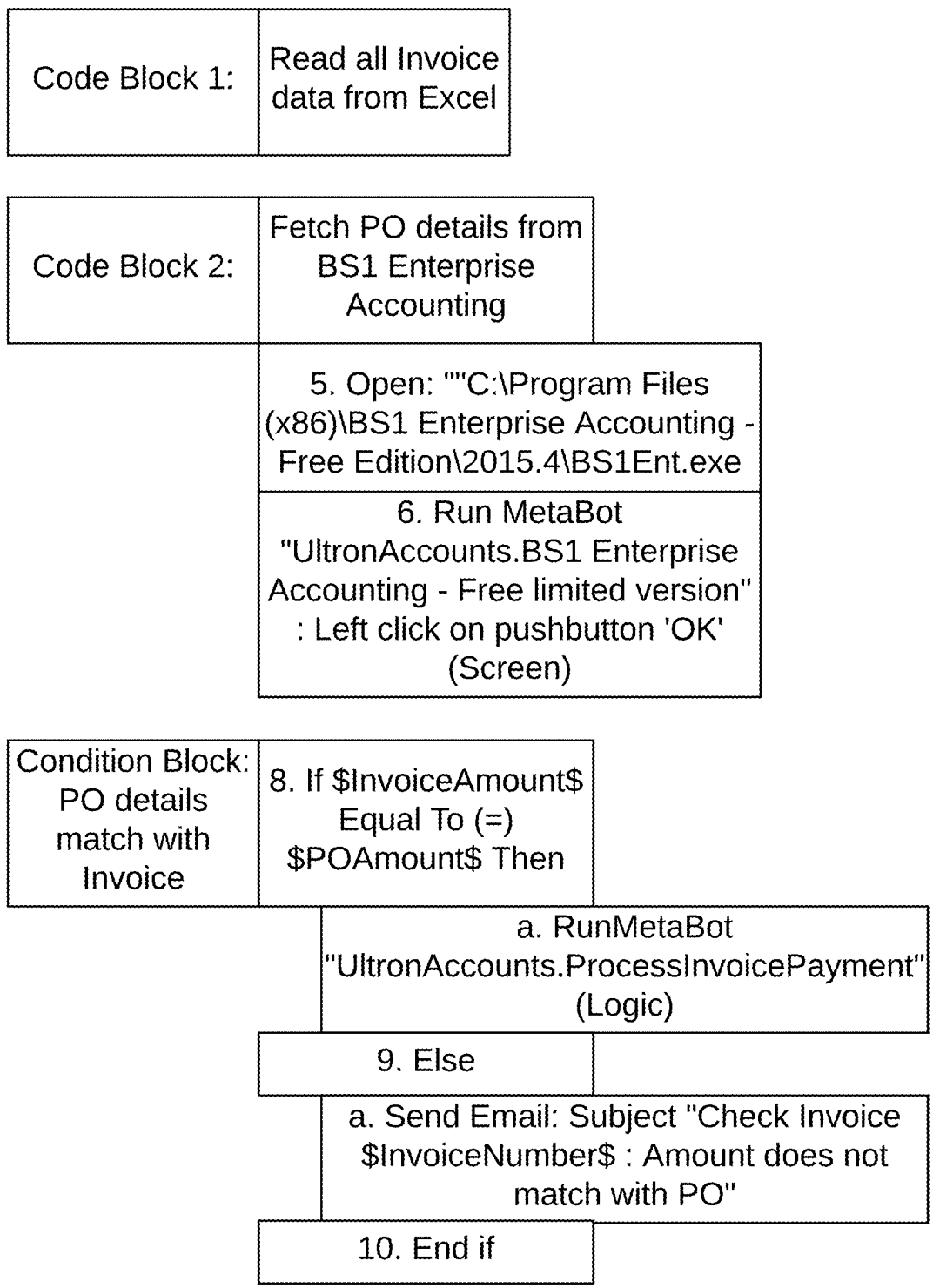
Figure 5M:
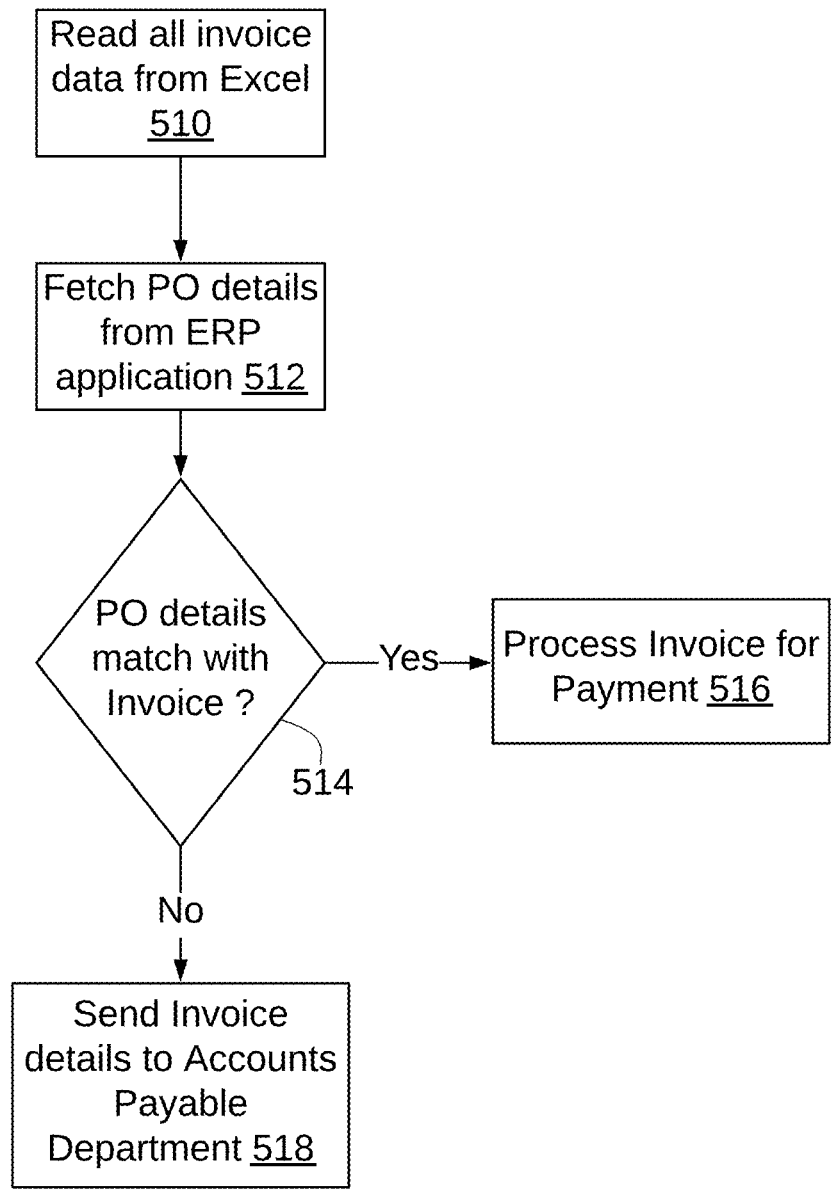
Figure 5N:
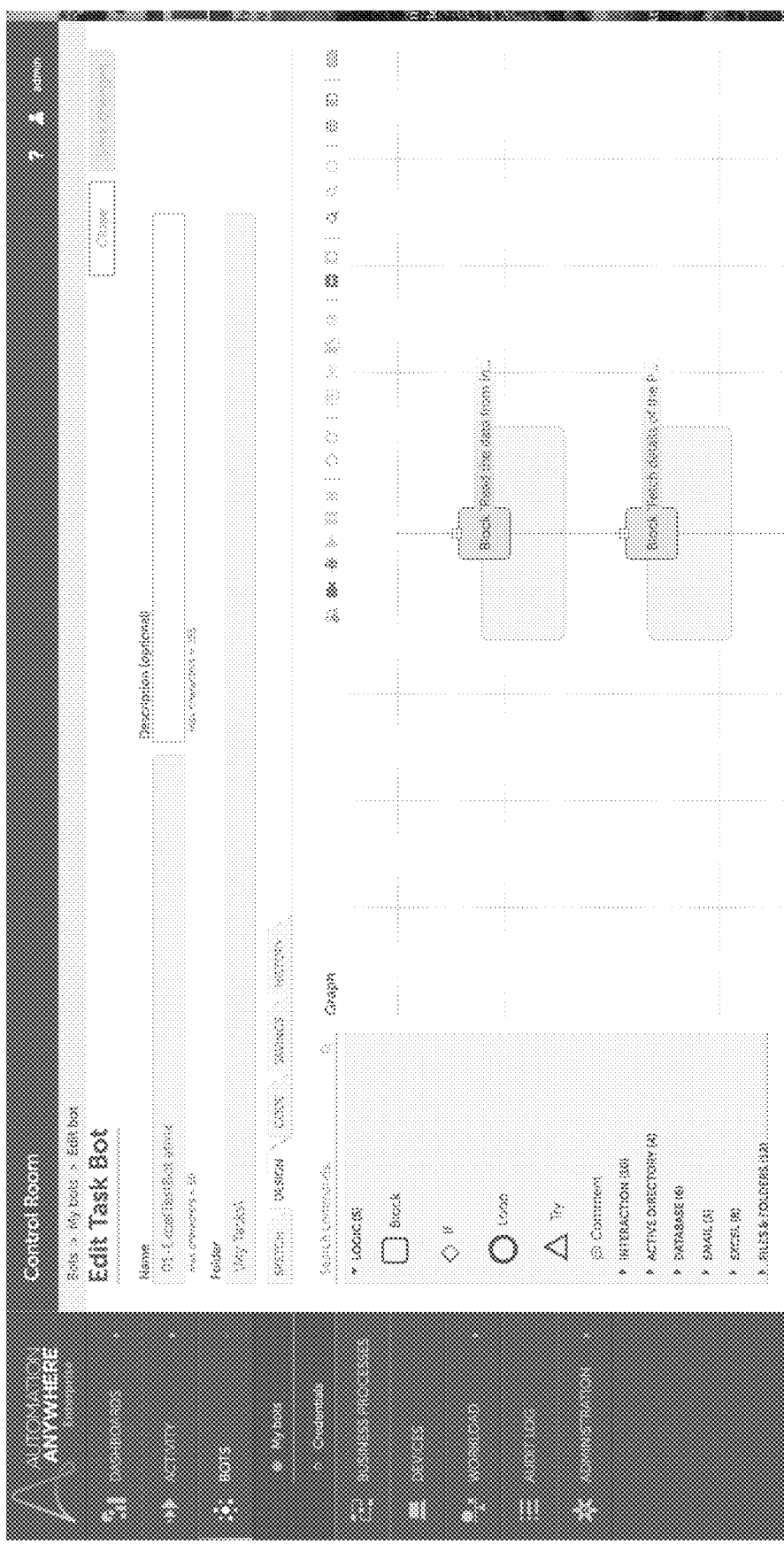
Figure 50:
Figure 5P:
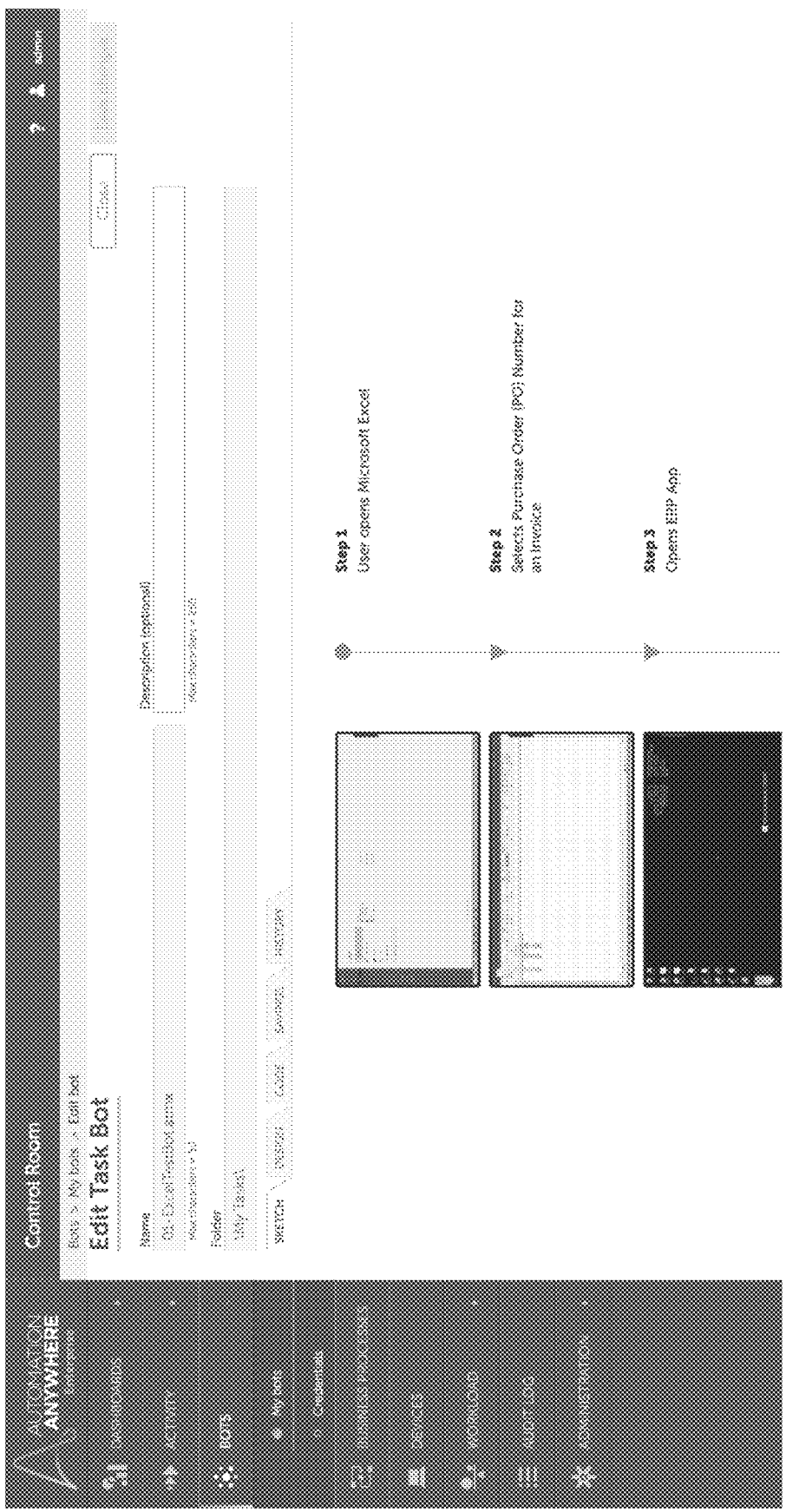
FIG. 5P is a screenshot showing a user interface for a sketch view embodiment.

FIGS. 5G, 5H, 5I, 5J, 5K, and 5L illustrate development of code for Code Block 2. In FIG. 5G the user 102 has collapsed the view for Code Block 1, thereby showing only the high-level command. In FIG. 5H, the user 102 has dragged an "Open Program/File" command and selected the application "BS1 Enterprise Accounting". In FIG. 5I, the user 102 has dragged the MetaBot "UltronAccounts.GetPODetails" and assigned the value to variable "POAmount" & "SupplierName". In FIG. 5J, the user 102 has dragged an If condition and matched "POAmount" with "InvoiceAmount". In FIG. 5K, the user 102 adds an action if the condition shown in FIG. 5J is shown to be true. Specifically, the action that is specified to be performed is the MetaBot "UltronAccounts.ProcessInvoicePayment". In FIG. 5L, the alternative condition, if the test in FIG. 5J is shown to be not true is specified, by specifying an email to be sent to the accounts payable department requesting that the invoice be checked as the amount does not match with the corresponding PO. The user 102 saves the created bot and selects design view and the system 10 responds by displaying a graphical view of the created bot, shown in FIG. 5M, where the bot reads all invoice data from the specified spreadsheet file at 510, fetches the PO details from the specified ERP application 512, compares the PO details with the invoice to see if they match at 514. If the details match at 514 the bot proceeds at 516 to process the invoice for payment and at 518, if the details do not match to send the invoice details by email to the accounts payable department. Sample user interfaces for the design view and code view embodiments may be seen in FIGS. 5N and 5O, which are screenshots showing user interfaces for the design view and code view embodiments, respectively. Another manner in which a bot may be generated is via the UI shown in in FIG. 5P which shows a screenshot of a sketch view interface in which user 102 may by simple inputs sketch the operations to be performed by a bot.

Figure 6:
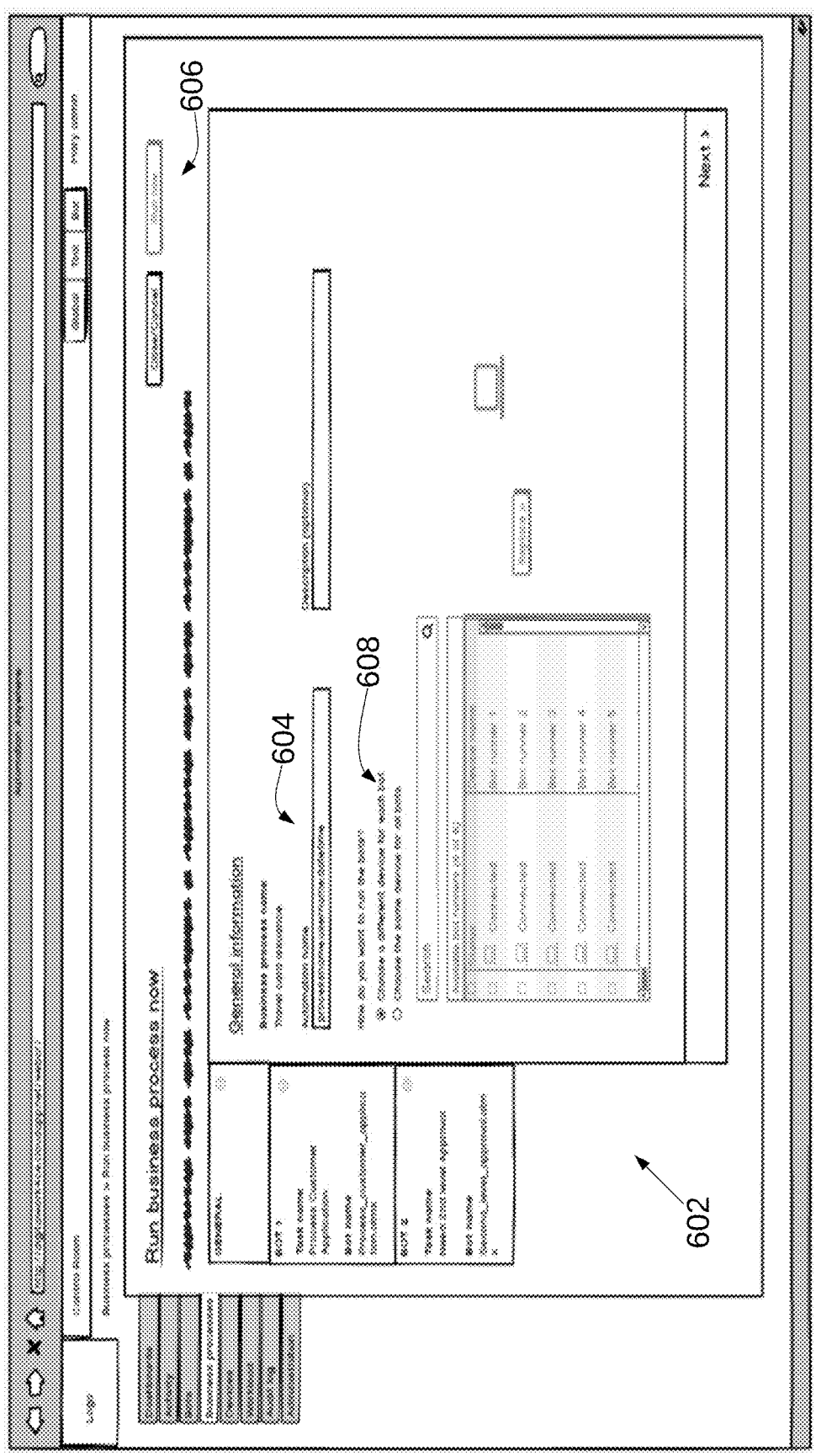
FIG. 6 is a screen shot showing aspects of a user interface generated by the computerized task automation system of FIG. 1 to execute a business process.

FIG. 6 is a screen shot showing aspects of a user interface generated by the computerized task automation system of FIG. 1 to execute a business process. The system 10 provides an interface 602 to permit the user 102 to select and to execute a business process. The user 102 enters at 604 a name of the process desired to be executed "Procurement Business process" and clicks on a Run button at 606. The user 102 also selects at 608 an option to "Choose a different device for each bot" option. The system 10 responds by executing a first activity, Activity 1: Generate Purchase order on a first device, Device: FINOP1, and executing a second activity, Activity 2: Invoice Reconciliation on a second device, Device: FINOP2.

Figure 7:
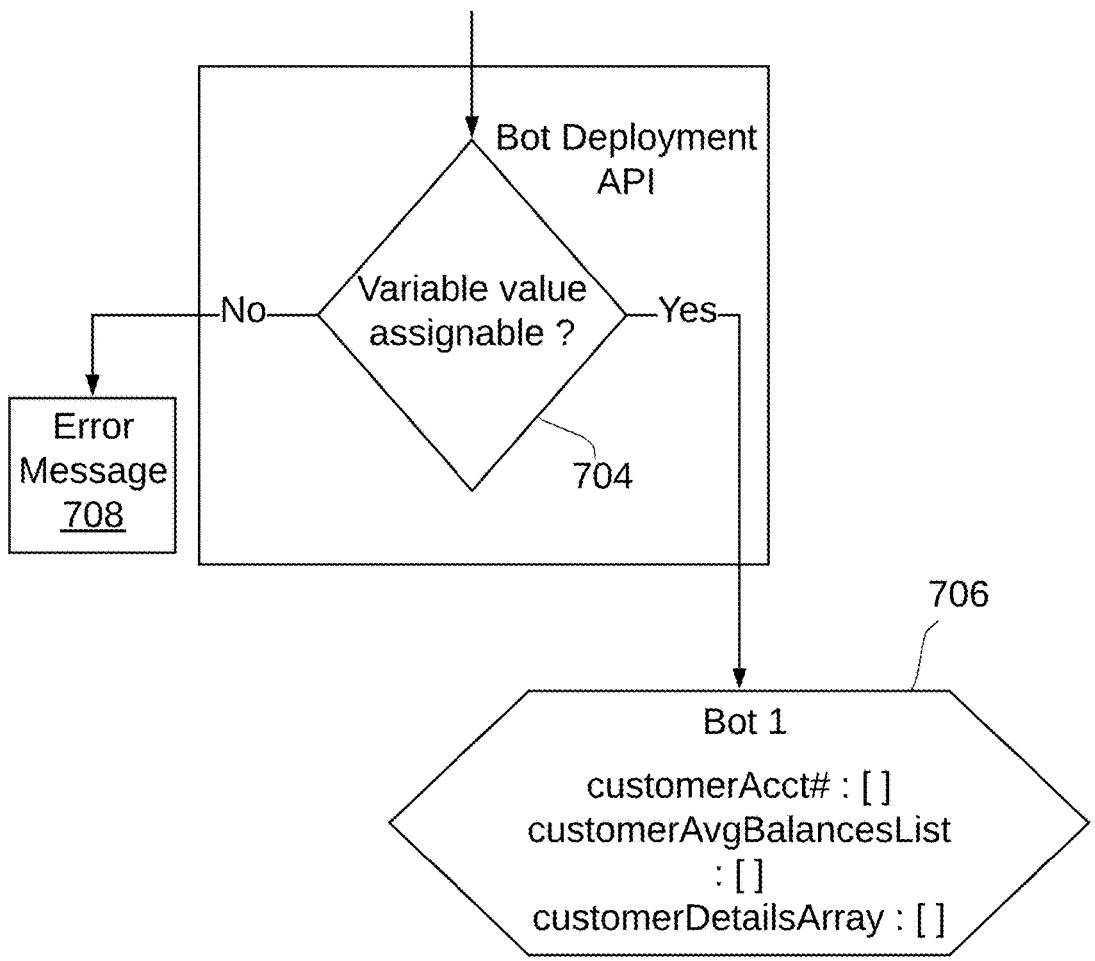
FIG. 7 is a flow diagram illustrating operation of a programmatic interface for interaction with software robots employed by the computerized task automation system of FIG. 1.

FIG. 7 is a flow diagram illustrating operation of a programmatic interface for interaction with software robots employed by the computerized task automation system of FIG. 1. Certain embodiments disclosed herein provide an Application Programming Interface (API) to permit deployment of a bot 116 from a separate application, such as a business process management application. Such embodiments provide a mechanism by way of a bot deployment API to permit variable used in a bot to be passed by a program to the bot thereby not requiring the input of a human user. FIG. 7 illustrates an example where a bot to be deployed is encoded to use three variables: (i) customerAcctNumber—a value type of variable, (ii) customerAvgBalancesList—a list type of variable, and (iii) customerDetailsArray—an array type of variable. The bot deployment API permits an application to interrogate a bot, and/or for the bot variables to be published, to enable the application 702 to identify the variable values to be provided to the bot upon invocation of the bot, or during operation of the bot. The API provides for a check to be performed at 704 to determine if variable values provided by the application are complete in that they specify all of the required variable values, and that they conform to the variable types. If so, the variable values are provided to the bot as shown at 706. Otherwise an error message is provided at 708.

Figure 8A:
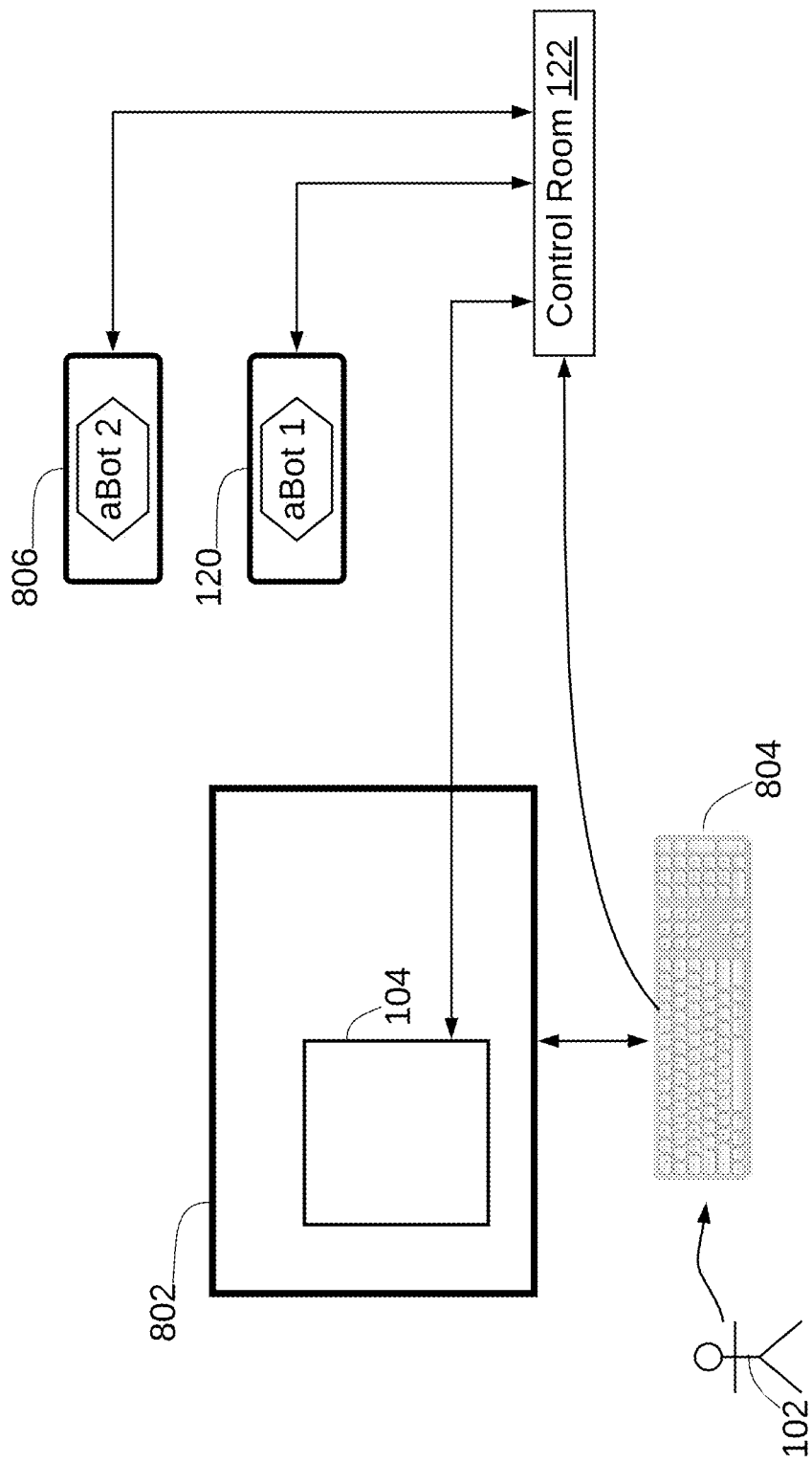
FIGS. 8A, 8B, 8C and 8D illustrate additional aspects of attended software robots.

FIGS. 8A, 8B, 8C and 8D illustrate additional aspects of attended software robots. In FIG. 8A user 102 interacts with UI 104, being displayed on display 802 by way of keyboard 804. The user 102 may initiate operation of an attended bot, such as aBot 1 by way of UI 104. Additionally, the user 102 may initiate operation of an attended bot, such as aBot 2 by way of a hotkey bot trigger, such as by pressing 'shift+A' to run a bot (even when the client is not up). The system 10 advantageously permits the execution of two bots in parallel and advantageously auto detects and disables hotkeys reserved by the operating system that controls the device on which UI 104 is displayed, and also auto disables hotkeys being used by other bots. Moreover, the bots may run in the background, so they are invisible to the user, such that no screens are displayed to the user. The system 10 supports two-way communication for the bots including a listen mode that provides for background bot listening, where a bot triggers on a particular human action, and a respond mode where user 102 can provide the bot values, files, folders, and yes/no responses. Moreover, the bots may continue to run even if the monitor 804 is configured to lock after a period of user inactivity.

Figure 8B:
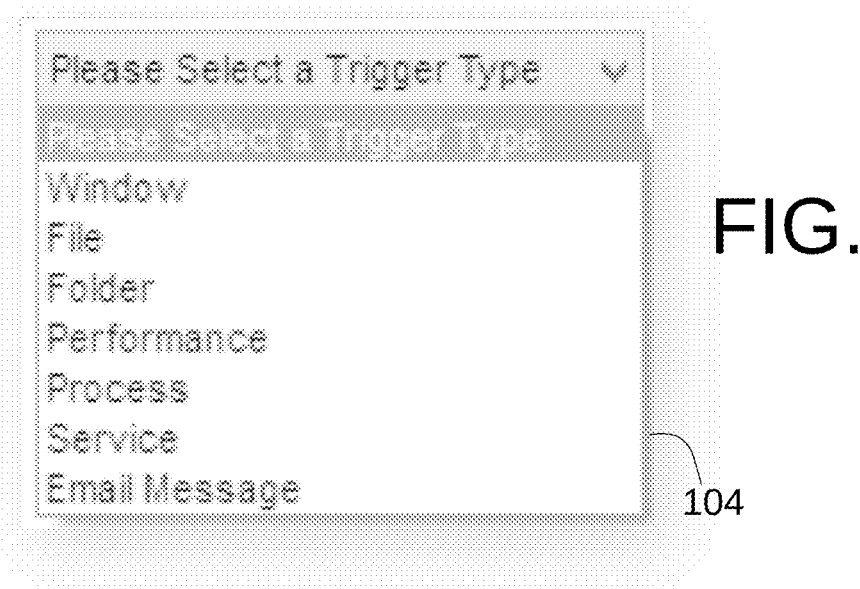

FIG. 8B is a screenshot showing system triggers supported by system 10. As seen, the following triggers are supported: Window, File, Folder, Performance, Process, Service, Email Message. Additionally, a plurality of object triggers may be supported including the following: UI element triggers capture actions on objects and images, monitor objects for enabled/disabled actions, monitor mouse actions on UI elements and images, hot keys triggers on UI elements and images, image change triggers—appear, disappear, alter. A plurality of package triggers may also be supported including: System, Process and application specific triggers such as Excel, and Database. The system 10 also permits the UI 104 to be initiated in a lightweight mode without need for central connectivity.

Figure 8C:
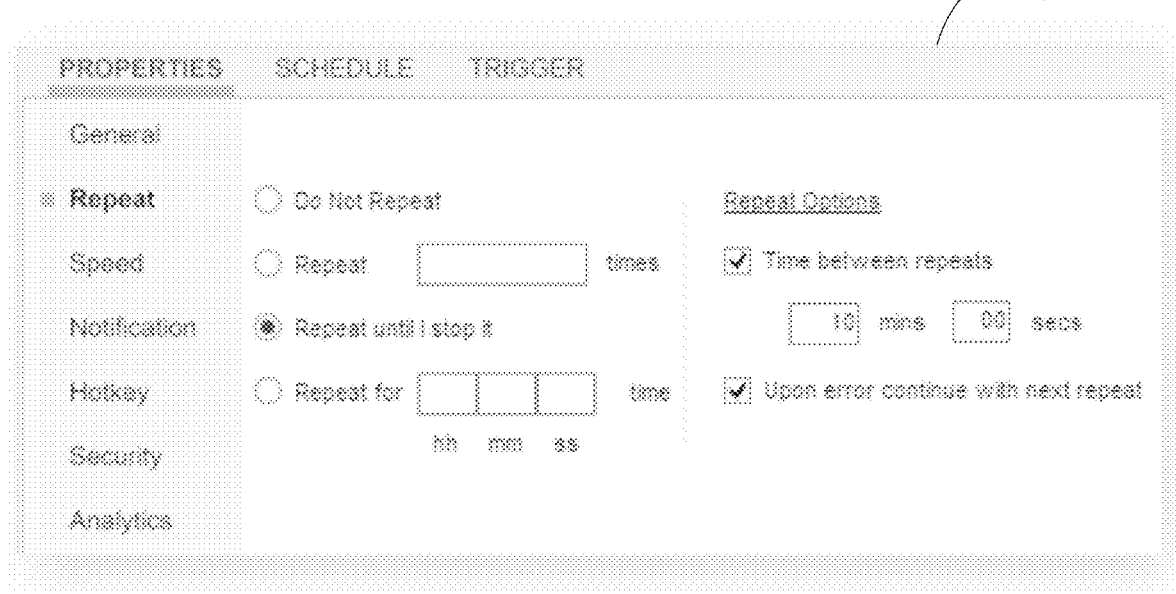
Figure 8D:
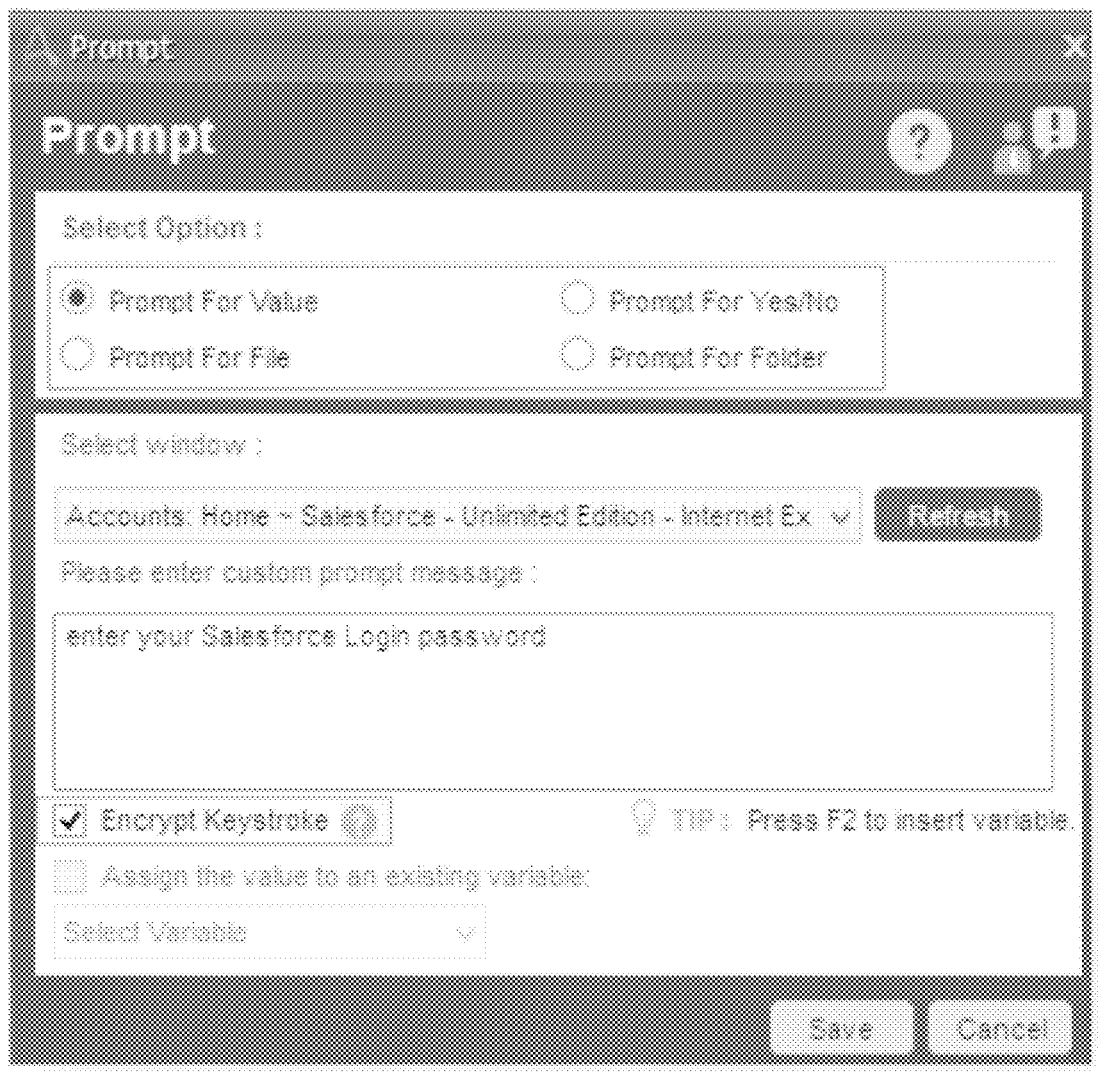

FIG. 8C is a screenshot of another aspect of UI 104 that permits configuration of bots that run continuously. As seen, a bot may be configured to repeat or to not repeat and if repeat is selected then the execution may continue until terminated by the user 102 or for a set period of time entered by the user 102. In addition, an interval time between repeats may be specified. Also, in case of an error a subsequent repeat execution may be specified to start automatically. FIG. 8D is a screenshot of another aspect of UI 104 where user 102 may specify conditions under which a bot that is executing prompts a user for information. As seen, the bot may be configured to prompt the user 102 for a value, a file, a yes/no answer and/or a folder, when such information is required by the bot. The user 102 may also specify a custom prompt message to be displayed to the user 102 in connection with a specific window.

As seen from the foregoing description, the workflows for hybrid RPA provide for a number of benefits including: (i) an easy way to stitch bots together with conditional logic, (ii) parallel/serial execution of attended bots, unattended bots and cognitive bots, transactional control and scope definition for task bots, (iii) an interface that permits easy design, visualization and execution of bots, (iv) run time visibility into work flow state, and (v) configurability to permit use of same triggers as bots.

Figure 9:
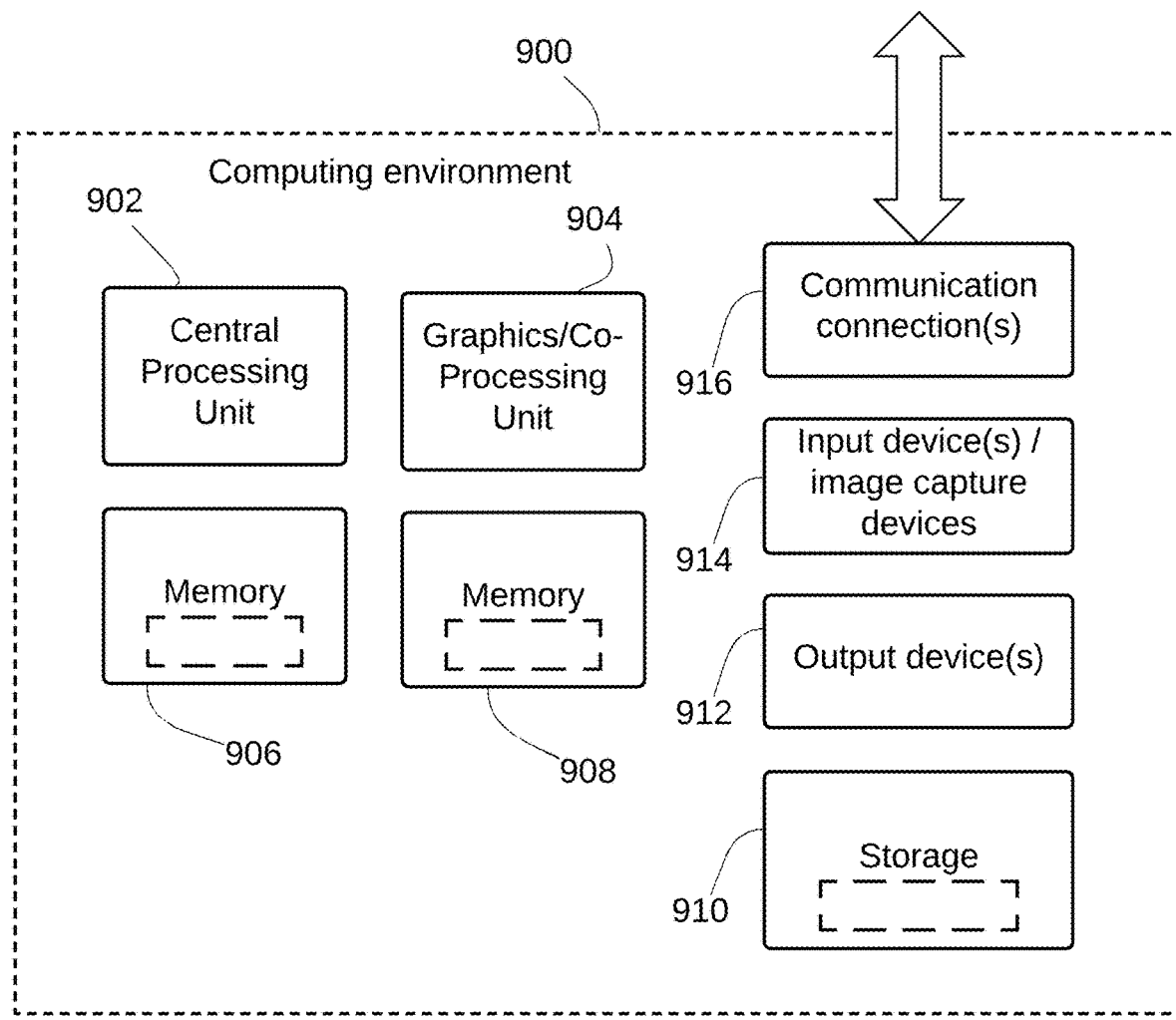
FIG. 9 illustrates a block diagram of hardware that may be employed in an implementation of the systems disclosed herein.

FIG. 9 illustrates a block diagram of hardware that may be employed in an implementation of the RPA system as disclosed herein. FIG. 9 depicts a generalized example of a suitable general-purpose computing system 900 in which the described innovations may be implemented in order to improve the processing speed and efficiency with which the computing system 900 operates to perform the functions disclosed herein. With reference to FIG. 9 the computing system 900 includes one or more processing units 902, 904 and memory 906, 908. The processing units 902, 906 execute computer-executable instructions. A processing unit can be a general-purpose central processing unit (CPU), processor in an application-specific integrated circuit (ASIC) or any other type of processor. The tangible memory 906, 908 may be volatile memory (e.g., registers, cache, RAM), non-volatile memory (e.g., ROM, EEPROM, flash memory, etc.), or some combination of the two, accessible by the processing unit(s). The hardware components in FIG. 9 may be standard hardware components, or alternatively, some embodiments may employ specialized hardware components to further increase the operating efficiency and speed with which the system 100 operates. The various components of computing system 900 may be rearranged in various embodiments, and some embodiments may not require nor include all of the above components, while other embodiments may include additional components, such as specialized processors and additional memory.

Computing system 900 may have additional features such as for example, storage 910, one or more input devices 914, one or more output devices 912, and one or more communication connections 916. An interconnection mechanism (not shown) such as a bus, controller, or network interconnects the components of the computing system 900. Typically, operating system software (not shown) provides an operating system for other software executing in the computing system 900, and coordinates activities of the components of the computing system 900.

The tangible storage 910 may be removable or non-removable, and includes magnetic disks, magnetic tapes or cassettes, CD-ROMs, DVDs, or any other medium which can be used to store information in a non-transitory way, and which can be accessed within the computing system 900. The storage 910 stores instructions for the software implementing one or more innovations described herein.

The input device(s) 914 may be a touch input device such as a keyboard, mouse, pen, or trackball, a voice input device, a scanning device, or another device that provides input to the computing system 900. For video encoding, the input device(s) 914 may be a camera, video card, TV tuner card, or similar device that accepts video input in analog or digital form, or a CD-ROM or CD-RW that reads video samples into the computing system 900. The output device(s) 912 may be a display, printer, speaker, CD-writer, or another device that provides output from the computing system 900.

The communication connection(s) 916 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computerized task automation system comprising:
 a computerized data storage containing at least:
  one or more data structures that each specify a process comprising a plurality of linked tasks, wherein a first portion of the tasks are manually performed by one or more user interactions with one or more application programs on a computer system, and wherein a second portion of the tasks are automatically performed by one or more software robots interacting with one or more application programs executing on one or more computer systems,
  wherein each software robot of the one or more software robots, is encoded with a set of instructions that cause the software robot to interact with one or more applications, as encoded by the set of instructions, to perform one or more tasks using the one or more applications to complete a task in a manner that a user would perform the task; and
 a processor programmed with instructions that when executed by the processor, cause the processor to at least:
  retrieve from the data storage, a process selected by a user;
  provide to the user an interface that provides a visual representation of the process including at least links among the tasks that specify a sequence in which the tasks are performed;
  accept from the user by way of the interface, one or more inputs to replace one or more of the first portion of the tasks with one or more of the software robots, wherein each of the one or more software robots takes one of three forms comprising:
   an attended software robot that is encoded to interact with one or more application programs and to accept one or more inputs from the user as required by the one or more application programs,
   an unattended software robot that is encoded to automatically interact with one or more application programs without any user input; and
   a cognitive software robot that is encoded to automatically interact with one or more application programs without any user input and is further encoded to automatically alter its interactions with the one or more application programs by way of a machine learning engine.

2. The computerized task automation system of claim 1 wherein the processor is further programmed to:
   accept one or more inputs by the user by way of the interface to permit the user to create a new software robot and to alter an existing software robot; and
   accept one or more inputs by the user by way of the interface to permit the user to select and to execute one or more of the processes.

3. The computerized task automation system of claim 1 wherein the one or more software robots interact with one or more other software robots by way of an application programming interface that permits a first of the one or more software robots to invoke execution of a second of the one or more software robots by executing a call defined by an application programming interface in the first of the one or more software robots and the second of the one or more software robots.

4. The computerized task automation system of claim 1 wherein the processor is further programmed to:
   provide to the user one or more recommendations of software robots available in the computerized data storage to perform one or more of the first portion of the tasks.

5. The computerized task automation system of claim 1 wherein the processor is further programmed to:
   provide to the user one or more recommendations of software robots available in the computerized data storage to perform one or more of the first portion of the tasks as a function of software robots mapped to perform the one or more of the first portion of the tasks.

6. The computerized task automation system of claim 1 wherein the processor is further programmed to:
   calculate an automation amount for the process selected by the user that is indicative of a number of automated steps in the process selected by the user as compared to a total number of steps in the process selected by the user; and
   present the automation amount to the user.

7. The computerized task automation system of claim 2 wherein the processor is further programmed to:
   provide to the user a visual interface that accepts from the user one or more inputs to specify actions to be performed by a new software robot.

8. A computerized method for performing task automation comprising:
   retrieving from the data storage, a process selected by a user, wherein the data storage contains at least one or more data structures that each specify a process comprising a plurality of linked tasks, wherein a first portion of the tasks are manually performed by one or more user interactions with one or more application programs on a computer system, and wherein a second portion of the tasks are automatically performed by one or more software robots interacting with one or more application programs executing on one or more computer systems, and wherein each software robot of the one or more software robots is encoded with a set of instructions that cause the software robot to interact with one or more applications, as encoded by the set of instructions, to perform one or more tasks using the one or more applications to complete a task in a manner that a user would perform the task;
   providing to the user an interface that provides a visual representation of the process including at least links among the tasks that specify a sequence in which the tasks are performed; and
   accepting from the user by way of the interface, one or more inputs to replace one or more of the first portion of the tasks with one or more of the software robots, wherein each of the one or more software robots takes one of three forms comprising:
      an attended software robot that is encoded to interact with one or more application programs and to accept one or more inputs from the user as required by the one or more application programs,
      an unattended software robot that is encoded to automatically interact with one or more application programs without any user input; and
      a cognitive software robot that is encoded to automatically interact with one or more application programs without any user input and is further encoded to automatically alter its interactions with the one or more application programs by way of a machine learning engine.

9. The computerized method of claim 8 further comprising:
   accepting one or more inputs by the user by way of the interface to permit the user to create a new software robot and to alter an existing software robot; and
   accepting one or more inputs by the user by way of the interface to permit the user to select and to execute one or more of the processes.

10. The computerized method of claim 8 wherein the one or more software robots interact with one or more other software robots by way of an application programming interface that permits a first of the one or more software robots to invoke execution of a second of the one or more software robots by executing a call defined by an application programming interface in the first of the one or more software robots and the second of the one or more software robots.

11. The computerized method of claim 8 further comprising:
   providing to the user one or more recommendations of software robots available in the computerized data storage to perform one or more of the first portion of the tasks.

12. The computerized method of claim 8 further comprising:
   providing to the user one or more recommendations of software robots available in the computerized data storage to perform one or more of the first portion of the tasks as a function of software robots mapped to perform the one or more of the first portion of the tasks.

13. The computerized method of claim 8 further comprising:
   calculating an automation amount for the process selected by the user that is indicative of a number of automated steps in the process selected by the user as compared to a total number of steps in the process selected by the user; and
   presenting the automation amount to the user.

14. The computerized method of claim 9 further comprising:
   providing to the user a visual interface that accepts from the user one or more inputs to specify actions to be performed by a new software robot.

15. A non-transitory storage medium, having stored thereupon one or more program modules comprising computer-executable instructions for execution on a computer system, the computer-executable instructions causing the computer system to implement a robotic process automation system that employs data storage containing one or more data structures that each specify a process comprising a plurality of linked tasks, wherein a first portion of the tasks are manually performed by one or more user interactions with one or more application programs on a computer system, and wherein a second portion of the tasks are automatically performed by one or more software robots interacting with one or more application programs executing on a one or more computer systems, the data storage further containing the one or more software robots, each software robot of the one or more software robots is encoded with a set of instructions that cause the software robot to interact with one or more applications, as encoded by the set of instructions, to perform one or more tasks using the one or more applications to complete a task in a manner that a user would perform the task, the computer executable instructions causing a processor when executing the computer executable instructions to at least:

retrieve from the data storage, a process selected by a user;

provide to the user an interface that provides a visual representation of the process that includes at least links among the tasks that specify a sequence in which the tasks are performed;

accept from the user by way of the interface, one or more inputs to replace one or more of the first portion of the tasks with one or more of the software robots, wherein each of the one or more software robots takes one of three forms comprising:

an attended software robot that is encoded to interact with one or more application programs and to accept one or more inputs from the user as required by the one or more application programs, an unattended software robot that is encoded to automatically interact with one or more application programs without any user input; and a cognitive software robot that is encoded to automatically interact with one or more application programs without any user input and is further encoded to automatically alter its interactions with the one or more application programs by way of a machine learning engine.

16. The non-transitory storage medium of claim 15 further comprising computer executable instructions causing the processor when executing the computer executable instructions to:

accept one or more inputs by the user by way of the interface to permit the user to create a new software robot and to alter an existing software robot; and accept one or more inputs by the user by way of the interface to permit the user to select and to execute one or more of the processes.

17. The non-transitory storage medium of claim 15 wherein the one or more of the software robots is encoded with instructions that causes interaction with one or more other software robots by way of an application programming interface that permits a first of the one or more software robots to invoke execution of a second of the one or more software robots by executing a call defined by an application programming interface in the first of the one or more software robots and the second of the one or more software robots.

18. The non-transitory storage medium of claim 15 further comprising computer executable instructions causing the processor when executing the computer executable instructions to:

provide to the user one or more recommendations of software robots available in the computerized data storage to perform one or more of the first portion of the tasks.

19. The non-transitory storage medium of claim 15 further comprising computer executable instructions causing the processor when executing the computer executable instructions to:

provide to the user one or more recommendations of software robots available in the computerized data storage to perform one or more of the first portion of the tasks as a function of software robots mapped to perform the one or more of the first portion of the tasks.

20. The non-transitory storage medium of claim 15 further comprising computer executable instructions causing the processor when executing the computer executable instructions to:

calculate an automation amount for the process selected by the user that is indicative of a number of automated steps in the process selected by the user as compared to a total number of steps in the process selected by the user; and present the automation amount to the user.

\* \* \* \* \*